United States Patent
Okamura et al.

(10) Patent No.: US 6,947,533 B2
(45) Date of Patent: Sep. 20, 2005

(54) COMMUNICATION APPARATUS, INFORMATION DISPLAY METHOD, INCOMING CALL DISPLAY METHOD, INCOMING CALL HISTORY DISPLAY METHOD, PROGRAMS FOR IMPLEMENTING THE METHODS, AND STORAGE MEDIUM IN WHICH THE PROGRAM IS STORED

(75) Inventors: Koji Okamura, Ibaraki (JP); Yutaka Inoue, Tokyo (JP)

(73) Assignee: Canon Kabushiki Kaisha (JP)

( * ) Notice: Subject to any disclaimer, the term of this patent is extended or adjusted under 35 U.S.C. 154(b) by 229 days.

(21) Appl. No.: 10/369,329

(22) Filed: Feb. 19, 2003

(65) Prior Publication Data

US 2003/0190025 A1 Oct. 9, 2003

(30) Foreign Application Priority Data

Feb. 18, 2002 (JP) .................................... 2002-040020
Mar. 25, 2002 (JP) .................................... 2002-083580
Dec. 4, 2002 (JP) .................................... 2002-352443

(51) Int. Cl.$^7$ .............................................. H04M 1/56
(52) U.S. Cl. ......................... 379/142.06; 379/142.01; 379/142.04; 379/88.11; 379/93.23; 455/415
(58) Field of Search ..................... 379/142.01, 142.04, 379/142.06, 142.13, 142.17, 93.23, 88.11, 354; 455/415, 418

(56) References Cited

U.S. PATENT DOCUMENTS

| | | | |
|---|---|---|---|
| 5,452,346 A | 9/1995 | Miyamoto | 379/142 |
| 6,295,340 B1 * | 9/2001 | Cannon et al. | 379/88.1 |
| 6,343,120 B1 * | 1/2002 | Rhodes | 379/142.01 |
| 6,449,351 B1 * | 9/2002 | Moss et al. | 379/142.09 |
| 6,662,006 B2 * | 12/2003 | Glass | 455/415 |
| 6,681,004 B2 * | 1/2004 | Strubbe et al. | 379/142.06 |
| 6,690,955 B1 * | 2/2004 | Komiyama | 455/566 |
| 6,697,484 B1 * | 2/2004 | Fleming, III | 379/354 |
| 6,771,754 B2 * | 8/2004 | Pelletier et al. | 379/142.01 |
| 6,771,755 B1 * | 8/2004 | Simpson | 379/142.04 |
| 6,826,270 B1 * | 11/2004 | Welch et al. | 379/142.06 |
| 2002/0196914 A1 * | 12/2002 | Ruckart | 379/88.21 |

* cited by examiner

Primary Examiner—Quoc Tran
(74) Attorney, Agent, or Firm—Rossi, Kimms & McDowell, LLP

(57) ABSTRACT

There is provided a communication apparatus, with which it is possible to prevent the conventional problem that in the case where an incoming call arrives, not a name registered by a user but a caller's name informed from a switching system is displayed and therefore user's confusion is caused. The communication apparatus is connected to a communication line that provides a service for informing of caller's information. A display device performs displaying related to an opposite party. Registered contents, in which a plurality of opposite parties's IDs and a plurality of opposite parties's names are associated with each other are searched for an opposite party's ID matching an opposite party's ID contained in the caller's information when the caller's information is detected at the time of arrival of an incoming call. An opposite party's name registered in association with the matching opposite party's ID in the registered contents is displayed on the display device when the matching opposite party's ID is found. A caller's name contained in the caller's information is on the display device when the matching opposite party's ID is not found.

15 Claims, 17 Drawing Sheets

FIG. 2

TELEPHONE DIRECTORY DATA (201)

| OPPOSITE PARTY'S TELEPHONE NUMBER | OPPOSITE PARTY'S NAME |
|---|---|
| 0299001212 | KAORICHAN |
| 0297002222 | KAZUMICHAN |
| 0293003434 | PUYAN |
| 0293004545 | YOSHIYUKIKUN |

INCOMING CALL HISTORY DATA (202)

| OPPOSITE PARTY'S TELEPHONE NUMBER | OPPOSITE PARTY'S NAME |
|---|---|
| 0330001111 | ICHITARO IWASAKI |
| 0450001212 | |
| 0297002222 | KENJI YOSHIDA |
| 0293004545 | YOSHIYUKI TAIRA |

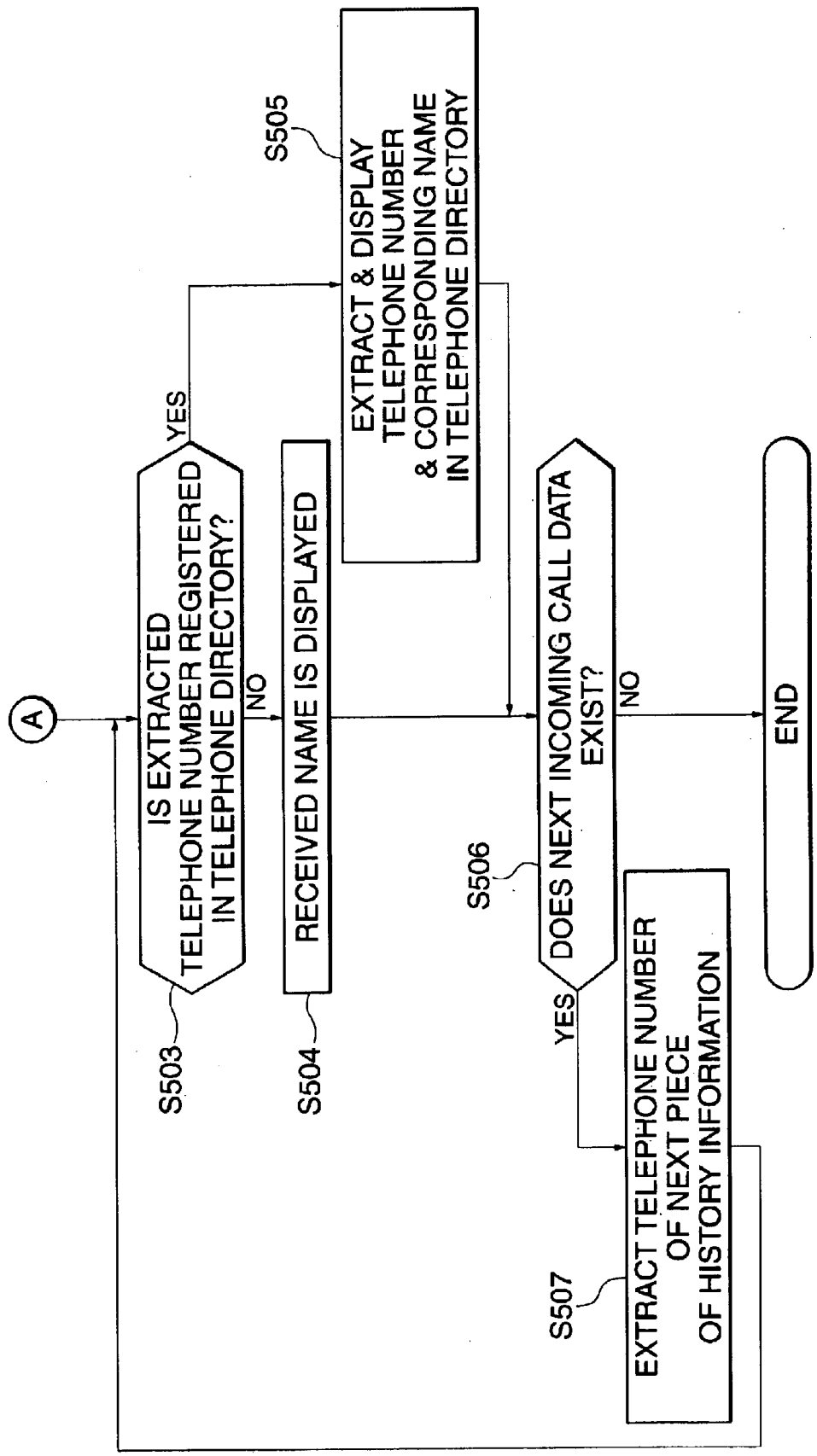

FIG. 6

TELEPHONE DIRECTORY DATA           201

| OPPOSITE PARTY'S TELEPHONE NUMBER | OPPOSITE PARTY'S NAME |
|---|---|
| 0299001212 | HIROMI IWASAKI |
| 0297002222 | YOTARO IWASAKI |
| 0293003434 | AI UEMURA |
| 0293004545 | RYOTARO KAMIOKA |
|  |  |

FIG. 9A

TELEPHONE DIRECTORY DATA 201

| OPPOSITE PARTY'S TELEPHONE NUMBER | OPPOSITE PARTY'S NAME |
|---|---|
| 03300011111 | ICHITARO IWASAKI |
| 0337534799 | SAYA INOUE |
| 0293003434 | PUYAN |
| 0293004545 | YOSHIYUKI TAIRA |
| ...... | ...... |

FIG. 9B

INCOMING CALL HISTORY DATA 202

| OPPOSITE PARTY'S TELEPHONE NUMBER | OPPOSITE PARTY'S NAME | TELEPHONE DIRECTORY REGISTRATION FLAG |
|---|---|---|
| 03300011111 | ICHITARO IWASAKI | 1 |
| 0450001212 | | 0 |
| 02970022222 | KENJI YOSHIDA | 0 |
| 0293004545 | YOSHIYUKI TAIRA | 1 |
| ...... | ...... | ...... |

FIG. 10A

INCOMING CALL HISTORY DISPLAY
WITH PRESENT EMBODIMENT         2304

INCOMING CALL HISTORY

TELEPHONE      NAME
NUMBER

0330001111     TEL ICHITARO IWASAKI
0450001212
0297002222     KENJI YOSHIDA
0293004545     TEL YOSHIYUKI TAIRA

FIG. 10B

INCOMING CALL HISTORY DISPLAY
WITH PRIOR ART                  2303

INCOMING CALL HISTORY

TELEPHONE      NAME
NUMBER

0330001111     ICHITARO IWASAKI
0450001212
0297002222     KENJI YOSHIDA
0293004545     YOSHIYUKI TAIRA

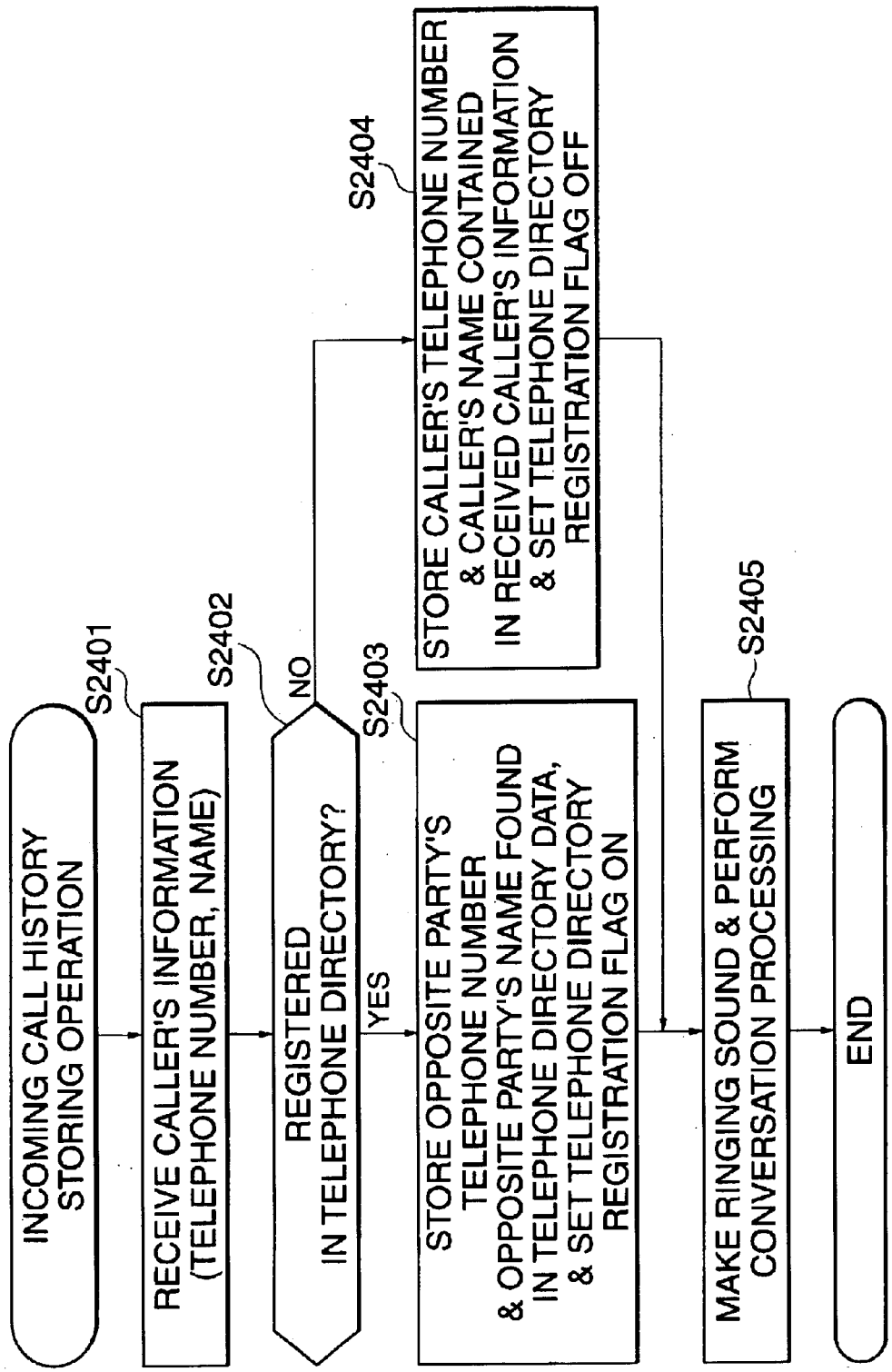

COMMUNICATION APPARATUS, INFORMATION DISPLAY METHOD, INCOMING CALL DISPLAY METHOD, INCOMING CALL HISTORY DISPLAY METHOD, PROGRAMS FOR IMPLEMENTING THE METHODS, AND STORAGE MEDIUM IN WHICH THE PROGRAM IS STORED

BACKGROUND OF THE INVENTION

1. Field of the Invention

The present invention relates to a communication apparatus that supports a so-called name display service in which a caller's telephone number and a caller's name are sent from a switching system to a callee, and in particular to a communication apparatus, an information display method, an incoming call display method, and an incoming call history display method, which are, for instance, suited for a case where an opposite party's name is displayed while avoiding user's confusion, and programs for implementing the methods, and a storage medium in which each program is stored.

2. Description of the Related Art

The name display service is a service in which an opposite party's telephone number and an opposite party's name received by a communication apparatus, such as a telephone set, are displayed on the display section of a communication apparatus, and is a service in which the opposite party's name is displayed even if a user does not register the opposite party's name in the communication apparatus in advance. That is, when viewed from a caller side, this service urges a callee side to answer a telephone call by informing the callee side of a caller's name. On the other hand, when viewed from the callee side, it is possible for the callee to answer the call with peace of mind because the service allows the callee to know the opposite party making the call. This means that the service is a technique of improving convenience on both of the caller side and the callee side.

Also, in the communication apparatus that supports the name display service described above, there is conceived a technique with which, for instance, by storing the received opposite party's telephone number and opposite party's name as incoming call history information, the opposite party's telephone number and the opposite party's name are displayed on the display section of the communication apparatus or are recorded (re-registered) in an address book or the like provided in a memory of the communication apparatus through a user's operation.

Also, there has conventionally been provided a service called a number display service that informs a callee of a caller's telephone number. For instance, a communication apparatus becomes widespread in which a user stores callers' telephone numbers and callers' names related to the telephone numbers in a telephone directory stored in a memory of the communication apparatus. When an incoming call arrives afterward, a caller's telephone number informed by the number display service is compared with the callers' telephone numbers stored in the telephone directory and, in the case where a caller's telephone number matching the informed caller's telephone number is stored in the telephone directory, a corresponding caller's name is stored as incoming call history information.

The conventional techniques described above, however, are beset by the following problems.

Even if a user has registered opposite parties's telephone numbers and opposite parties's names in the telephone directory or the like of a communication apparatus, when an incoming call arrives from one of the registered opposite parties, not the opposite party's name registered by the user but an opposite party's name informed by the switching system is displayed, which may cause user's confusion. For instance, it is assumed that the telephone number at a home is registered at a telecommunications carrier using a father's name "Kenji Yoshida" and the opposite party, to which a call is placed, is informed of this name "Kenji Yoshida" from the switching system. In this case, if a daughter at the home, whose name is "Kazumi Yoshida", places a call to her friend, her father's name "Kenji Yoshida" is displayed on the friend's telephone set.

Also, in the case where an incoming call arrives from an opposite party that is not registered in the telephone directory of the communication apparatus and the name of the opposite party is registered in the telephone directory afterward, the opposite party's name informed by the switching system is stored as incoming call history information. Consequently, in the case where the incoming call history information is displayed/recorded through a user's operation, not the opposite party's name registered in the telephone directory by the user but the opposite party's name informed by the switching system is displayed/recorded, which also causes user's confusion.

Also, conventionally, displaying at the time of arrival of an incoming call from an opposite party registered in the telephone directory or the like of a communication apparatus and displaying at the time of arrival of an incoming call from an opposite party that is not registered in the telephone directory or the like have been performed using the same method. This leads to inconvenience that if a user does not remember registered contents of the telephone directory, it is impossible for the user to clearly judge whether the incoming call is from an opposite party registered in the telephone directory or is from an opposite party that is not registered in the telephone directory and the user does not know at all. Also, because it is impossible for the user to make the judgment, there is also inconvenience that it is impossible for the user to judge whether opposite party's information related to the incoming call needs to be newly registered in the telephone directory or not.

In addition, when the user confirms an incoming call history by displaying the incoming call history on the display section of the communication apparatus, it is impossible for the user to distinguish whether a displayed opposite party's name is an opposite party's name registered in the telephone directory of the communication apparatus or an opposite party's name received through the name display service. This also causes user's confusion.

For, instance, in the case where an opposite party's name that is the same as or close to an opposite party's name registered in the telephone directory is received through the name number display service (in more detail, in the case where the opposite party's name registered in the telephone directory is "Kazumi Yoshida" and the opposite party's name received through the name number display service is "Kazuko Yoshida"), this causes confusion in which, for instance, a callee guesses wrong that the incoming call is from "Kazumi Yoshida" by glancing the incoming call history and makes a call to "Kazumi Yoshida" for nothing in particular.

In the case where only the opposite party's name is displayed as the incoming call history at the communication apparatus, the confusion described above becomes particularly prominent. On the other hand, in the case where both of the opposite party's name and the opposite party's telephone number are displayed on the communication apparatus, it becomes possible to reduce the confusion, although it is required to specify the opposite party (caller) by checking the opposite party's telephone number as well as the opposite party's name, which means that the visibility is impaired in this case.

Further, in the case of a communication apparatus by which an opposite party's name and an opposite party's telephone number in incoming call history information are separately displayed, it is required for a user to perform an operation to also display the opposite party's telephone number, which means that the user is required to perform a complicated operation.

Further, in the case where a received opposite party's name is displayed as an incoming call history at all times at a communication apparatus, when an incoming call arrives from an opposite party having a telephone number that is the same as a telephone number registered in the telephone directory of the communication apparatus, if the received opposite party's name differs from an opposite party's name registered in the telephone directory, this causes further user's confusion.

SUMMARY OF THE INVENTION

It is a first object of the present invention to provide a communication apparatus, and an information display method, with which it is possible to prevent the conventional problem that in the case where an incoming call arrives, not a name registered by a user but a caller's name informed from a switching system is displayed and therefore user's confusion is caused, and a program for implementing the method, and a storage medium in which the program is stored.

It is a second object of the present invention to provide a communication apparatus, and an incoming call display method, with which it is possible to recognize whether an incoming call is from an acquaintance registered in a telephone directory or from a person who is not registered in the telephone directory by checking whether a telephone directory mark is contained in information displayed by the communication apparatus at the time of arrival of the incoming call, and a program for implementing the method, and a storage medium in which the program is stored.

It is a third object of the present invention to solve the problems described above by providing a communication apparatus, and an incoming call history display method, with which it is possible for a user to discriminate a caller at a glance and to check the importance or the like of a received telephone call with ease, in addition, it is possible to avoid user's confusion and to achieve other effects, and a program for implementing the method, and a storage medium in which the program is stored.

To attain the first object, in a first aspect of the present invention, there is provided a communication apparatus connected to a communication line that provides a service for informing of caller's information, comprising a display that performs displaying related to an opposite party, and a display controller that (a) searches registered contents, in which a plurality of opposite parties's IDs and a plurality of opposite parties's names are associated with each other, for an opposite party's ID matching an opposite party's ID contained in the caller's information when the caller's information is detected at a time of arrival of an incoming call, (b) displays an opposite party's name registered in association with the matching opposite party's ID in the registered contents on the display device when the matching opposite party's ID is found, and (c) displays a caller's name contained in the caller's information on the display device when the matching opposite party's ID is not found.

To attain the first object, the first aspect of the present invention provides an information display method executed by a communication apparatus connected to a communication line that provides a service for informing of caller's information, comprising a display control step of (a) searching registered contents, in which a plurality of opposite parties's IDs and a plurality of opposite parties's names are associated with each other, for an opposite party's ID matching an opposite party's ID contained in the caller's information when the caller's information is detected at a time of arrival of an incoming call, (b) displaying an opposite party's name registered in association with the matching opposite party's ID in the registered contents when the matching opposite party's ID is found, and (c) displays a caller's name contained in the caller's information when the matching opposite party's ID is not found.

To attain the first object, the first aspect of the present invention provides a program for implementing an information display method applied to a communication apparatus connected to a communication line that provides a service for informing of caller's information, comprising a search module for searching registered contents, in which a plurality of opposite parties's IDs and a plurality of opposite parties's names are associated with each other, for an opposite party's ID matching an opposite party's ID contained in the caller's information when the caller's information is detected at a time of arrival of an incoming call, and a display control module for displaying an opposite party's name registered in association with the matching opposite party's ID in the registered contents when the matching opposite party's ID is found, and displaying a caller's name contained in the caller's information when the matching opposite party's ID is not found.

To attain the first object, the first aspect of the present invention provides a computer-readable storage medium storing the above program.

With the above arrangement according to the first aspect of the present invention, it is possible to solve the problem with the prior art that user's confusion is caused because not a name registered by a user but a caller's name informed from a switching system is displayed.

Preferably, the communication apparatus according to the first aspect comprises a detection device that detects the caller's information, and a registration device that registers the plurality of opposite parties's IDs and the plurality of opposite parties's names in association with each other, and wherein the display controller (a) searches the registered contents of the registration device for the opposite party's ID matching the opposite party's ID contained in the caller's information when the detection device detects the caller's information at the time of the arrival of the incoming call, (b) displays the opposite party's name registered in association with the matching opposite party's ID in the registration device on the display device when the matching opposite party's ID is found, and (c) displays the caller's name contained in the caller's information on the display device when the matching opposite party's ID is not found.

More preferably, when an opposite party's telephone number corresponding to the matching opposite party's ID is found in the registration device, the display controller displays an opposite party's name registered in association with the opposite party's telephone number in the registration device and the opposite party's telephone number on the display device, and when the opposite party's telephone number corresponding to the matching opposite party's ID is not found in the registration device, the display controller displays the caller's name and a caller's telephone number contained in the caller's information on the display device.

Preferably, the display controller (a) searches the registered contents of the registration device for an opposite party's ID matching an opposite party's ID contained in incoming call history information related to opposite parties, from which incoming calls arrived, when displaying of the incoming call history information is instructed, (b) displays an opposite party's name registered in association with the matching opposite party's ID in the registration device on the display device when the matching opposite party's ID is found, and (c) displays a caller's name contained in the incoming call history information on the display device when the matching opposite party's ID is not found.

More preferably, the communication apparatus according to the first aspect comprises a storage device that stores the incoming call history information related to the opposite parties, from which the incoming calls arrived, and an instruction device that receives an instruction for displaying the incoming call history information stored in the storage device, wherein the display controller (a) searches the registered contents of the registration device for the opposite party's ID matching the opposite party's ID contained in the incoming call history information stored in the storage device when the displaying of the incoming call history information is instructed by the instruction device, (b) displays the opposite party's name registered in association with the matching opposite party's ID in the registration device on the display device when the matching opposite party's ID is found, and (c) displays the caller's name contained in the incoming call history information stored in the storage device on the display device when the matching opposite party's ID is not found.

More preferably, when an opposite party's telephone number corresponding to the matching opposite party's ID is found, the display controller displays an opposite party's name registered in association with the opposite party's telephone number in the registration device and the opposite party's telephone number on the display device, and when the opposite party's telephone number corresponding to the matching opposite party's ID is not found, the display controller displays the caller's name and a caller's telephone number contained in the incoming call history information stored in the storage device on the display device.

Preferably, the communication apparatus according to the first aspect is an apparatus selected from the group consisting of a facsimile apparatus, a desk telephone set, a mobile telephone set, and an automobile telephone set.

Preferably, in the information display method according to the first aspect, in the display control step, (a) when displaying of incoming call history information related to opposite parties, from which incoming calls arrived, is instructed, the registered contents are searched for each opposite party's ID matching an opposite party's ID contained in the incoming call history information, (b) when the matching opposite party's ID is found, an opposite party's name registered in association with the matching opposite party's ID in the registered contents is displayed, and when the matching opposite party's ID is not found, a caller's name contained in the incoming call history information is displayed.

To attain the second object, in a second aspect of the present invention, there is provided a communication apparatus connected to a communication line that provides a service for informing of caller's information, comprising a display device, a registration device that registers a plurality of opposite parties's IDs and a plurality of opposite parties's names in association with each other, and a display controller that performs incoming call displaying on the display device using a first display method when an opposite party matching an opposite party's ID contained in the caller's information received at a time of arrival of an incoming call is registered in the registration device, and performs the incoming call displaying on the display device using a second display method when the opposite party matching the opposite party's ID is not registered in the registration device.

To attain the second object, the second aspect of the present invention provides an incoming call display method executed by a communication apparatus connected to a communication line that provides a service for informing of caller's information and including a display device, and a registration device that registers a plurality of opposite parties's IDs and a plurality of opposite parties's names in association with each other, the method comprising a display control step of performing incoming call displaying on the display device using a first display method when an opposite party matching an opposite party's ID contained in the caller's information received at a time of arrival of an incoming call is registered in the registration device, and performing the incoming call displaying on the display device using a second display method when the opposite party matching the opposite party's ID is not registered in the registration device.

To attain the second object, the second aspect of the present invention provides a program for executing an incoming call display method by a communication apparatus connected to a communication line that provides a service for informing of caller's information and including a display device, and a registration device that registers a plurality of opposite parties's IDs and a plurality of opposite parties's names in association with each other, the program comprising a display control module for performing incoming call displaying on the display device using a first display method when an opposite party matching an opposite party's ID contained in the caller's information received at a time of arrival of an incoming call is registered in the registration device, and performing the incoming call displaying on the display device using a second display method when the opposite party matching the opposite party's ID is not registered in the registration device and a computer-readable storage medium that stores a program.

To attain the second object, the second aspect of the present invention provides a computer-readable storage medium that stores the above program.

With the above arrangement according to the second aspect of the present invention, it is possible for a user to grasp whether an incoming call is from an acquaintance registered in the telephone directory or from a person who is not registered in the telephone directory.

Preferably, the communication apparatus according to the second aspect comprises a caller's information detection device that detects the caller's information, and a search device that searches the registration device for the opposite party matching the opposite party's ID contained in the caller's information, and wherein when it is found that the opposite party matching the opposite party's ID is registered in the registration device as a result of the searching by the search device, the display controller displays an opposite party's name registered in association with the opposite party's ID on the display device using the first display method, and when it is found that the opposite party matching the opposite party's ID is not registered in the registration device as a result of the searching by the search device, the display controller displays an opposite party's name contained in the caller's information on the display device using the second display method.

Preferably, the first display method comprises notifying that the opposite party's name registered in the registration device is being displayed.

More preferably, the first display method comprises displaying registration information indicating that the opposite party's name registered in the registration device is being displayed, and information containing the opposite party's name.

More preferably, the registration information comprises a sign or a character showing that the opposite party matching the opposite party's ID has already been registered in the registration device.

Preferably, the second display method comprises notifying that the opposite party's name contained in the caller's information is being displayed.

More preferably, the second display method comprises displaying unregistration information indicating that the opposite party's name contained in the caller's information is being displayed, and information containing the opposite party's name contained in the caller's information.

More preferably, the unregistration information comprises a sign or a character showing that the opposite party matching the opposite party's ID has not yet been registered in the registration device.

Preferably, the communication apparatus is an apparatus selected from the group consisting of a facsimile apparatus, a desk telephone set, a mobile telephone set, and an automobile telephone set.

To attain the third object, in a third aspect of the present invention, there is provided a communication apparatus connected to a communication line that provides a service for informing of caller's information, comprising a detection device that detects the caller's information, a storage device that stores incoming call history related to the caller's information, a registration device that registers a plurality of opposite parties's IDs and a plurality of opposite parties's names in association with each other, a storage controller that (a) searches the registration device for an opposite party's ID matching a caller's ID contained in the caller's information detected by the detection device at a time of arrival of an incoming call, (b) stores an opposite party's name registered in association with the matching opposite party's ID in the storage device when the matching opposite party's ID is found, and (c) stores a caller's name contained in the caller's information in the storage device when the matching opposite party's ID is not found, and a display controller that discriminates whether each name stored in the storage device is an opposite party's name registered in the registration device or a received caller's name, in response to an instruction for displaying of storage contents of the storage device, and switches the displaying in accordance with a result of the discrimination.

To attain the third object, the third aspect of the present invention provides an incoming call history display method executed by a communication apparatus connected to a communication line that provides a service for informing of caller's information, and including a detection device that detects the caller's information, a storage device that stores incoming call history related to the caller's information, a registration device that registers a plurality of opposite parties's IDs and a plurality of opposite parties's names in association with each other, the method comprising a detection step for detecting the caller's information, a storage control step of (a) searching the registration device for an opposite party's ID matching a caller's ID contained in the caller's information detected in the step of detecting the caller's information at a time of arrival of an incoming call, (b) storing an opposite party's name registered in association with the matching opposite party's ID in the storage device when the matching opposite party's ID is found, and (c) storing a caller's name contained in the caller's information in the storage device when the matching opposite party's ID is not found, and a display control step of discriminating whether each name stored in the storage device is an opposite party's name registered in the registration device or a received caller's name, in response to an instruction for displaying of storage contents of the storage device, and switching the displaying in accordance with a result of the discrimination.

To attain the third object, the third aspect of the present invention provides a program for executing an incoming call history display method by a communication apparatus connected to a communication line that provides a service for informing of caller's information, and including a detection device that detects the caller's information, a storage device that stores incoming call history related to the caller's information, a registration device that registers a plurality of opposite parties's IDs and a plurality of opposite parties's names in association with each other, the program comprising a detection module for detecting the caller's information, a storage module for (a) searching the registration device for an opposite party's ID matching a caller's ID contained in the caller's information detected at a time of arrival of an incoming call, (b) storing an opposite party's name registered in association with the matching opposite party's ID in the storage device when the matching opposite party's ID is found, and (c) storing a caller's name contained in the caller's information in the storage device when the matching opposite party's ID is not found, and a switching module for discriminating whether each name stored in the storage device is an opposite party's name registered in the registration device or a received caller's name, in response to an instruction for displaying of storage contents of the storage device, and switching the displaying in accordance with a result of the discrimination.

To attain the third object, the third aspect of the present invention provides a storage medium that stores the above program.

With the above arrangement according to the third aspect of the present invention, it is possible for a user to discriminate a caller at a glance and to confirm the importance or the like of a received telephone call with ease. In addition, it is possible to avoid user's confusion that has conventionally been caused.

Preferably, the matching opposite party's ID is found in the registration device, the storage controller stores an opposite party's telephone number as the opposite party's ID, the opposite party's name registered in association with the opposite party's ID, and a notification that the opposite party's name is a name registered in the registration device in the storage device, and when the matching opposite party's ID is not found in the registration device, the storage controller stores a caller's telephone number as the caller's ID, the caller's name, and a notification that the caller's name is a received name in the storage device.

Preferably, when determining that a name stored in the storage device is an opposite party's name registered in the registration device, the display controller displays the opposite party's name registered in the registration device by adding a predetermined sign to the opposite party's name.

To attain the third object, in a fourth aspect of the present invention, there is provided a communication apparatus connected to a communication line that provides a service for informing of caller's information, comprising a detection device that detects the caller's information, a storage device that stores incoming call history related to the caller's information, a registration device in which a plurality of opposite parties's IDs and opposite parties's names are registered in association with each other, a storage controller that stores the caller's information detected by the detection device at a time of arrival of an incoming call in the storage device, and a display controller that (a) searches the registration device for an opposite party's ID matching a caller's ID contained in the caller's information stored in the storage device when displaying of storage contents of the storage device is instructed, (b) displays a caller's name contained in the caller's information when the matching opposite party's ID is not found, and (c) displays an opposite party's name registered in association with the opposite party's ID in a manner such that the opposite party's name is discriminated from the caller's name when the matching opposite party's ID is found.

To attain the third object, the fourth aspect of the present invention provides an incoming call history display method executed by a communication apparatus connected to a communication line that provides a service for informing of caller's information and including a detection device that detects caller's information, a storage device that stores incoming call history related to the caller's information, and a registration device in which a plurality of opposite parties's IDs and opposite parties's names are registered in association with each other, the method comprising a detection step of detecting the caller's information, a storage control step of storing the caller's information detected in the step of detecting the caller's information at the a item of arrival of an incoming call in the storage device, and a display control step of (a) searching the registration device for an opposite party's ID matching a caller's ID contained in the caller's information stored in the storage device when displaying of storage contents of the storage device is instructed, (b) displaying a caller's name contained in the caller's information when the matching opposite party's ID is not found, and (c) displaying an opposite party's name registered in association with the opposite party's ID in a manner such that the opposite party's name is discriminated from the caller's name when the matching opposite party's ID is found.

To attain the third object, the fourth aspect of the present invention provides a program for executing an incoming call history display method by a communication apparatus connected to a communication line that provides a service for informing of caller's information, and including a detection device that detects the caller's information, a storage device that stores incoming call history related to the caller's information, a registration device that registers a plurality of opposite parties's IDs and a plurality of opposite parties's names in association with each other, the program comprising a detection module for detecting the caller's information, a storage control module for storing the caller's information detected at a time of arrival of an incoming call in the storage device, and a display control module for (a) searching the registration device for an opposite party's ID matching a caller's ID contained in the caller's information stored in the storage device when displaying of storage contents of the storage device is instructed, (b) displaying a caller's name contained in the caller's information when the matching opposite party's ID is not found, and (c) displaying an opposite party's name registered in association with the opposite party's ID in a manner such that the opposite party's name is discriminated from the caller's name when the matching opposite party's ID is found.

To attain the third object, the fourth aspect of the present invention provides a computer-readable storage medium that stores the above program.

With the above arrangement according to the fourth aspect of the present invention, it is possible for a user to discriminate a caller at a glance and to avoid user's confusion that has conventionally been caused. In addition, because searching of the registration device is performed at the time of displaying the incoming call history information, the communication apparatus is not required to store redundant information as the incoming call history information and therefore it is possible to reduce the storage capacity of the communication apparatus.

Preferably, when the matching opposite party's ID is found, the display controller displays the opposite party's name by adding a predetermined sign to the opposite party's name.

The above and other objects, features and advantages of the invention will become more apparent from the following detailed description taken in conjunction with the accompanying drawings.

BRIEF DESCRIPTION OF THE DRAWINGS

FIG. 2 shows registered contents of telephone directory data provided in a RAM of the communication apparatus and registered contents of incoming call history data provided in the RAM of the communication apparatus;

FIGS. 5A and 5B is a flowchart showing an incoming call history display operation of the communication apparatus;

FIG. 6 shows registered contents of telephone directory data provided in a RAM of a communication apparatus according to a second embodiment of the present invention;

FIG. 9A shows registered contents of telephone directory data stored in a RAM of a communication apparatus according to a third embodiment of the present invention;

FIG. 9B shows registered contents of incoming call history data stored in the RAM of the communication apparatus according to the third embodiment;

FIG. 10A shows an example of information displayed at the time of displaying of an incoming call history in the third embodiment;

FIG. 10B shows an example of information displayed at the time of displaying of an incoming call history with the prior art;

FIG. 11 is a flowchart showing an incoming call history storing operation of the communication apparatus;

DETAILED DESCRIPTION OF THE PREFERRED EMBODIMENTS

The present invention will now be described in detail with reference to the accompanying drawings showing preferred embodiments thereof.

First, there will be described the outline of a first embodiment of the present invention to be described below. In this first embodiment, at a communication apparatus, a telephone number matching a caller's telephone number contained in received caller's information is searched from telephone directory data. Then, if the matching telephone number is found, an opposite party's name and an opposite party's telephone number registered in the telephone directory data are displayed. On the other hand, if the matching telephone number is not found, a caller's name and the caller's telephone number contained in the received caller's information are displayed. Also, at the time of displaying of an incoming call history at the communication apparatus, a telephone number matching a caller's telephone number registered in incoming call history data is searched from the telephone directory data. Then, if the matching telephone number is found, an opposite party's name and an opposite party's telephone number registered in the telephone directory data are displayed. On the other hand, if the matching telephone number is not found, the caller's name and the caller's telephone number registered in the incoming call history data are displayed.

Figure 1:
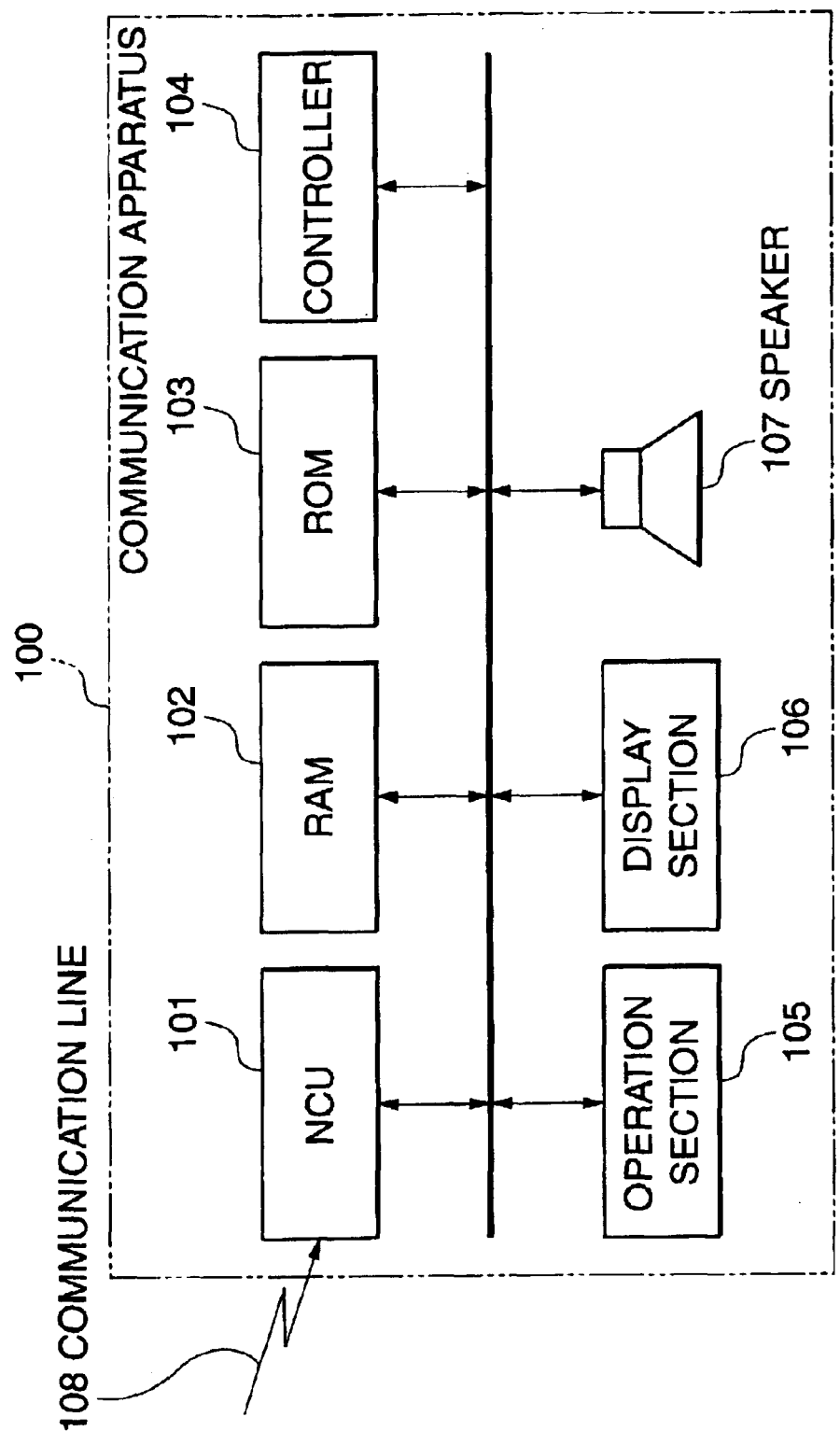
FIG. 1 is a block diagram showing the construction of a communication apparatus according to a first embodiment of the present invention that is applied to a facsimile apparatus.

FIG. 1 is a block diagram showing the construction of a communication apparatus (facsimile apparatus) according to the first embodiment. The communication apparatus 100 is comprised of an NCU (Network Control Unit) 101, a RAM 102, a ROM 103, a controller 104, an operating section 105, a display section 106, and a speaker 107. Reference numeral 108 in the figure denotes a communication line.

The present communication apparatus 100 having the construction described above performs communication with an opposite party's terminal through the communication line 108. Also, this communication apparatus 100 and the opposite party's terminal exchange a caller's number and a caller's name through this communication line 108 and a switching system. The NCU 101 is a network control apparatus for establishing connection with the opposite party's terminal through the communication line 108, and the communication apparatus 100 is connected to the communication line 108 through the NCU 101. The NCU 101 has known functions of, for instance, establishing electrical insulation between a communication line 108 side and the inside of the communication apparatus, capturing a line in response to an instruction from the controller 104, releasing the line, sending a dial pulse and a tone, and monitoring the line. In the RAM 102, there are stored the telephone directory data, incoming call history data, control data, and the like. In the ROM 103, there are stored control programs executed by the controller 104 and initial values of various settings.

The controller 104, which is composed of a microprocessor or the like, controls each functional block shown in FIG. 1 in accordance with programs written in the ROM 104, and carries out processes shown in the flowcharts in FIGS. 4, 5A and 5B to be described later. The operation section 105 is composed of a keyboard, a pointing device, and the like, constitutes a user interface together with the display section 106 to be described later, receives an operator's operation related to call placing/call answering/registration and the like, and informs the controller 104 of the operator's operation. The display section 106 displays information that should be informed to the operator such as the number dialed to place a call or the current state of the communication apparatus 100. The speaker 107 is used to monitor a voice signal on the communication line 108, to send a ringing signal to the operator, and to emit an operational sound and an error sound. In order to output these sounds from the speaker 107, it is assumed that an unillustrated sound synthesizing circuit, amplifier, and the like, none of which are shown, are used.

FIG. 2 shows registered contents of the telephone directory data and registered contents of the incoming call history data stored in the RAM 102 of the communication apparatus 100. In the telephone directory data 201, there are registered opposite party's telephone numbers and opposite party's names preset by a user of the communication apparatus 100. In the incoming call history data 202, there are registered opposite party's telephone numbers and opposite party's names as an incoming call history in the communication apparatus 100.

Figure 3:
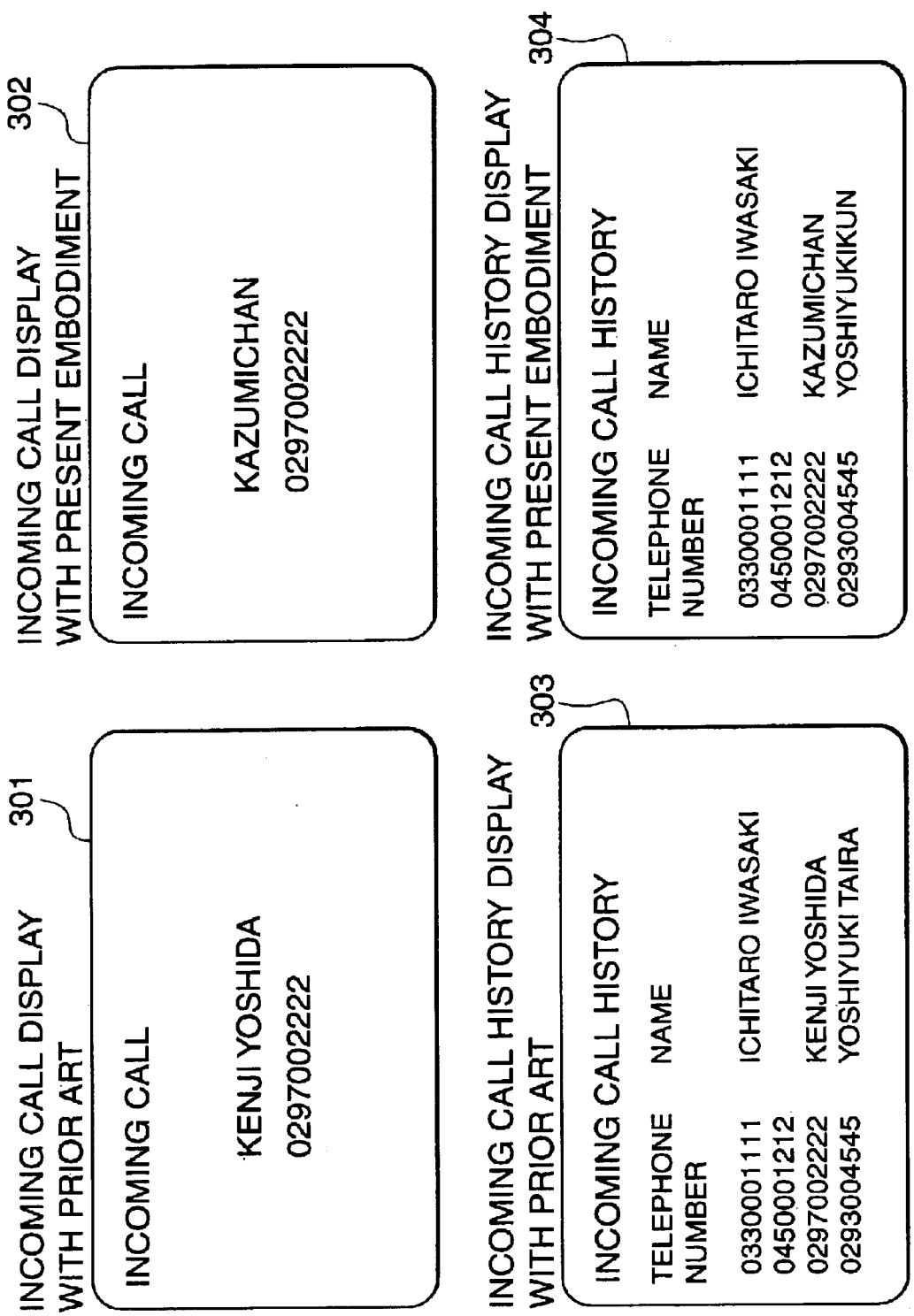
FIG. 3 shows an example of information displayed at the time of arrival of an incoming call in the first embodiment, an example of information displayed at the time of arrival of an incoming call with the prior art, an example of information displayed at the time of displaying of an incoming call history in the first embodiment, and an example of information displayed at the time of displaying of an incoming call history with the prior art.

FIG. 3 shows an example of information displayed at the time of arrival of an incoming call in the present embodiment, an example of information displayed at the time of arrival of an incoming call with the prior art, an example of information on the incoming call history displayed in the present embodiment, and an example of information on the incoming call history displayed with the prior art. In the case of the prior art, at the time of arrival of an incoming call, when caller's information is received from a switching system, the telephone number and name contained in the received caller's information are displayed. Therefore, in the case where an opposite party registered using a name "Kazumichan" in the telephone directory data 201 is registered at a telecommunications carrier using a different name "Kenji Yoshida", for instance, when an incoming call arrives from the opposite party (in the case where there is detected an incoming call from an opposite party listed in the third place from the top of the incoming call history data 202), the telephone number "0297002222" and the name "Kenji Yoshida" informed from the switching system are displayed as indicated by "INCOMING CALL DISPLAY WITH PRIOR ART" 301 in FIG. 3.

Also, with the prior art, when displaying of the incoming call history is instructed by the user, the contents of the incoming call history data 202 are displayed as they are. Consequently, in the case where an opposite party registered in the telephone directory data using the name "Kazumichan" is registered at the telecommunications carrier using the different name "Kenji Yoshida", for instance, when an incoming call from the opposite party arrives and displaying of the incoming call history is instructed by the user after history data is accumulated as indicated by the incoming call history data 202 in FIG. 2, the telephone number "0297002222" and the name "Kenji Yoshida" informed from the switching system are displayed as indicated by "INCOMING CALL HISTORY DISPLAY WITH PRIOR ART" 303 in FIG. 3.

In contrast to this, in the present embodiment, at the time of arrival of an incoming call, in the case where the caller's telephone number contained in caller's information received from the switching system is contained in the telephone directory data 201 in the RAM 102, the opposite party's telephone number and opposite party's name found in the telephone directory data 201 are displayed on the display section 106 as indicated by "INCOMING CALL DISPLAY IN PRESENT EMBODIMENT" 302 in FIG. 3. Also, in the present embodiment, when displaying of the incoming call history is instructed by the user, the opposite party's telephone number and opposite party's name retrieved from the telephone directory data 201 in the RAM 102 are displayed on the display section 106 as indicated by "INCOMING CALL HISTORY DISPLAY IN PRESENT EMBODIMENT" 304 in FIG. 3. As a result, it is possible to solve the problem with the prior art that user's confusion is caused because not a name registered by the user but a caller's name informed from the switching system is displayed. Details of operations performed in the present embodiment to achieve the displaying described above will be described below.

Next, how the communication apparatus in the present embodiment constructed in the manner described above operates will be described in detail with reference to the flowcharts shown in FIGS. 4, 5A and 5B.

<Incoming Call Display Operation>

Figure 4:
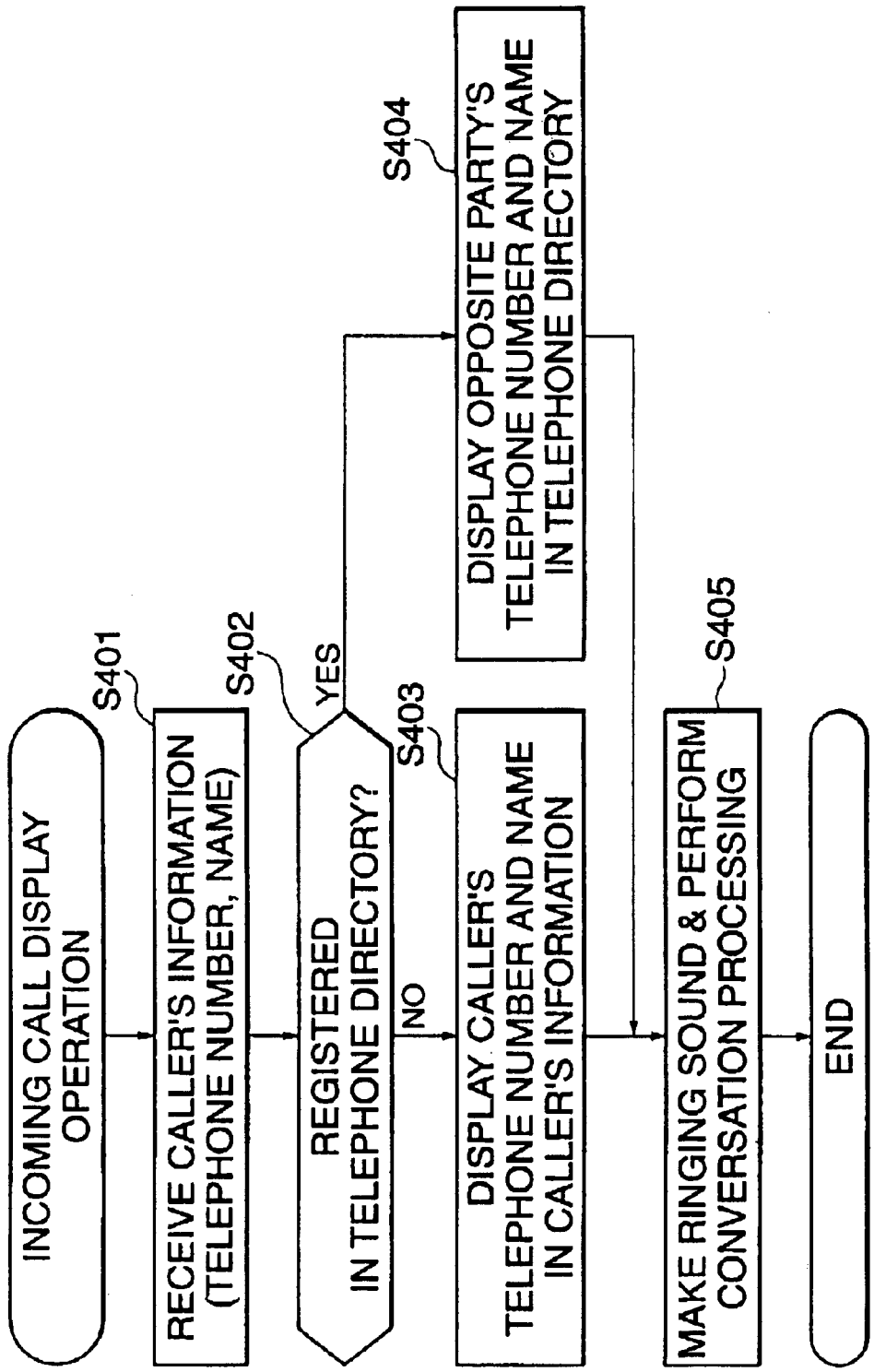
FIG. 4 is a flowchart showing an incoming call display operation of the communication apparatus.

FIG. 4 is a flowchart showing an incoming call display operation of the communication apparatus. Now, how the communication apparatus operates to display an incoming call will be described with reference to FIG. 4. The processing shown in this flowchart is carried out by the controller 104 of the communication apparatus 100 based on a control program stored in the ROM 103.

In step S401, the controller 104 of the communication apparatus 100 receives caller's information from the switching system through the NCU 101 and the process proceeds to step S402. In step S402, the controller 104 searches the telephone directory data 201 in the RAM 102 for the caller's telephone number contained in the caller's information received in step S401 described above. If the caller's telephone number is not found in the telephone directory data 201 in the RAM 102, the process proceeds to step S403. On the other hand, if the caller's telephone number is found in the telephone directory data 201 in the RAM 102, the process proceeds to step S404.

In the case where the caller's telephone number is not found in the telephone directory data 201 in the RAM 102, the process proceeds to step S403, in which the controller 104 displays the caller's telephone number and caller's name contained in the caller's information received in step S401 on the display section 106 as indicated by the incoming call display 301 in FIG. 3. On the other hand, in the case where the caller's telephone number is found in the telephone directory data 201 in the RAM 102, the process proceeds to step S404, in which the controller 104 displays the opposite party's telephone number and name found in the telephone directory data 201 in the RAM 102 on the display section 106 as indicated by the incoming call display 302 in FIG. 3. In step S405, the controller 104 makes a ringing sound in synchronism with a ringing signal coming from the communication line 108 through the NCU 101 and, when the user answers the call, carries out conversation processing.

According to the above described operation of the present embodiment, in the case where the telephone number "0297002222" and the name "Kenji Yoshida" are informed from the switching system as caller's information like in the case of the conventional example described above, the telephone directory data 201 in the RAM 102 is searched for the telephone number "0297002222". An opposite party listed in the second place from the top is found, and the opposite party's telephone number "0297002222" and name "kazumichan" are displayed on the display section 106 as indicated by the incoming call display 302 in FIG. 3.

<Incoming Call History Display Operation>

Figure 5A:
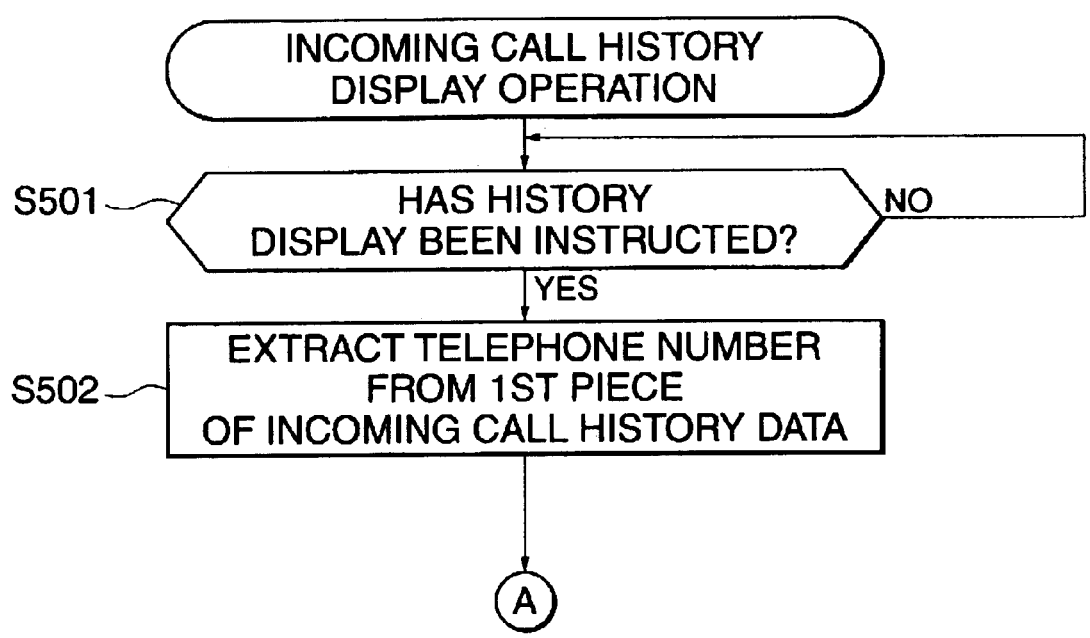

FIGS. 5A and 5B is a flowchart showing an incoming call history display operation of the communication apparatus. How the communication apparatus according to the present embodiment operates to display the incoming call history will be described with reference to FIGS. 5A and 5B. The processing shown in this flowchart is carried out by the controller 104 of the communication apparatus 100 based on a control program stored in the ROM 103.

In step S501, the controller 104 of the communication apparatus 100 determines whether displaying of the incoming call history is instructed from the operation section 105. In the case where the incoming call history displaying is instructed, the process proceeds to step S502. In this step S502, the controller 104 extracts a telephone number from the first piece of data of the incoming call history data 202 in the RAM 102 and the process proceeds to step S503. In step S503, the controller 104 searches. the telephone directory data 201 in the RAM 102 for the telephone number extracted from the first piece of data of the incoming call history data 202 in the RAM 102. If the telephone number is not found, the process proceeds to step S504. On the other hand, if the telephone number is found, the process proceeds to step S505.

In the case where the telephone number is not found, the process proceeds to step S504, in which the controller 104 extracts the telephone number and a name corresponding to the telephone number from the incoming call history data 202 in the RAM 102 and displays them on the display section 106. On the other hand, in the case where the telephone number is found, the process proceeds to step S505, in which the controller 104 extracts the telephone number and a name corresponding to the telephone number from the telephone directory data 201 in the RAM 102 and displays them on the display section 106. In step S506, the controller 104 determines whether the next piece of incoming call data exists in the incoming call history data 202 in the RAM 102. If the next piece of incoming call data exists in the incoming call history data 202 in the RAM 102, the process proceeds to step S507. On the other hand, if the next piece of incoming calls data does not exist in the incoming call history data 202 in the RAM 102, the present process is terminated. If the next piece of incoming call data exists in the incoming call history data 202 in the RAM 102, the process proceeds to step S507, in which the controller 104 extracts the telephone number of the next piece of history information from the incoming call history data 202, repeats the processing in steps S503 to S507 described above, and additionally displays information on the display section 106 in order.

According to the above described operation of the present embodiment, even if displaying of the incoming call history is instructed by a user after history data (such as the incoming call history data 202) is accumulated like in the case of the conventional example described above, the telephone number "0297002222" is searched from the telephone directory data 201 in the RAM 102, and if the opposite party listed in the second place from the top is found, this opposite party's telephone number "0297002222" and its related name "Kazumichan" are displayed on the display section 106 as indicated by the incoming call history display 304 in FIG. 3.

As described above, according to the first embodiment, a telephone number matching the caller's telephone number contained in received caller's information is searched from the telephone directory. In the case where the matching telephone number is found, an opposite party's name in the telephone directory is displayed. On the other hand, in the case where the matching telephone number is not found, the caller's name contained in the received caller's information is displayed. Also, at the time of displaying of the incoming call history, a telephone number matching a caller's telephone number contained in the incoming call history information is searched from the telephone directory. In the case where the matching telephone number is found, an opposite party's name in the telephone directory is displayed. On the other hand, in the case where the matching telephone number is not found, a caller's name contained in the incoming call history information is displayed. As a result, an effect can be provided that in the case where an incoming call arrives, it is possible to solve the problem with the prior art that user's confusion is caused because not a name registered by a user but a caller's name informed from a switching system is displayed.

Although in the first embodiment, as an example, the communication apparatus of the present invention is applied to a facsimile apparatus, the present invention is not limited to the facsimile apparatus and is also applicable to a desk telephone set, a mobile telephone set, or an automobile telephone set.

Next, a description will be given of a second embodiment of the present invention. The second embodiment is outlined as follows: When caller's information is received by the communication apparatus at the time of arrival of an incoming call, an opposite party matching an opposite party's ID in the received caller's information is searched from registered information. If the matching opposite party is found, an opposite party's name registered in association with the opposite party's ID is displayed and a notification that the registered opposite party's name is being displayed (showing that the displayed opposite party's name has already been registered) is displayed. On the other hand, if the matching opposite party is not found, the opposite party's name contained in the received caller's information is displayed. Alternatively, if the matching opposite party is found, the opposite party's name registered in association with the opposite party's ID may be displayed and, if the matching opposite party is not found, a notification that the opposite party's name contained in the received caller's information is being displayed (showing that the displayed name is not yet registered) may be displayed along with the opposite party's name contained in the received caller's information.

It should be noted that the construction of the communication apparatus according to the second embodiment is the same as that of the communication apparatus according to the first embodiment (see FIG. 1) and therefore detailed description of the construction of the communication apparatus according to the present embodiment is omitted.

FIG. 6 shows an example of the telephone directory data 201 provided in the RAM 102 of the communication apparatus 100. In the telephone directory data 201 in the RAM 102 of the communication apparatus 100, opposite parties's telephone numbers and opposite parties's names related to a plurality of opposite parties are registered in association with each other.

Figure 7:
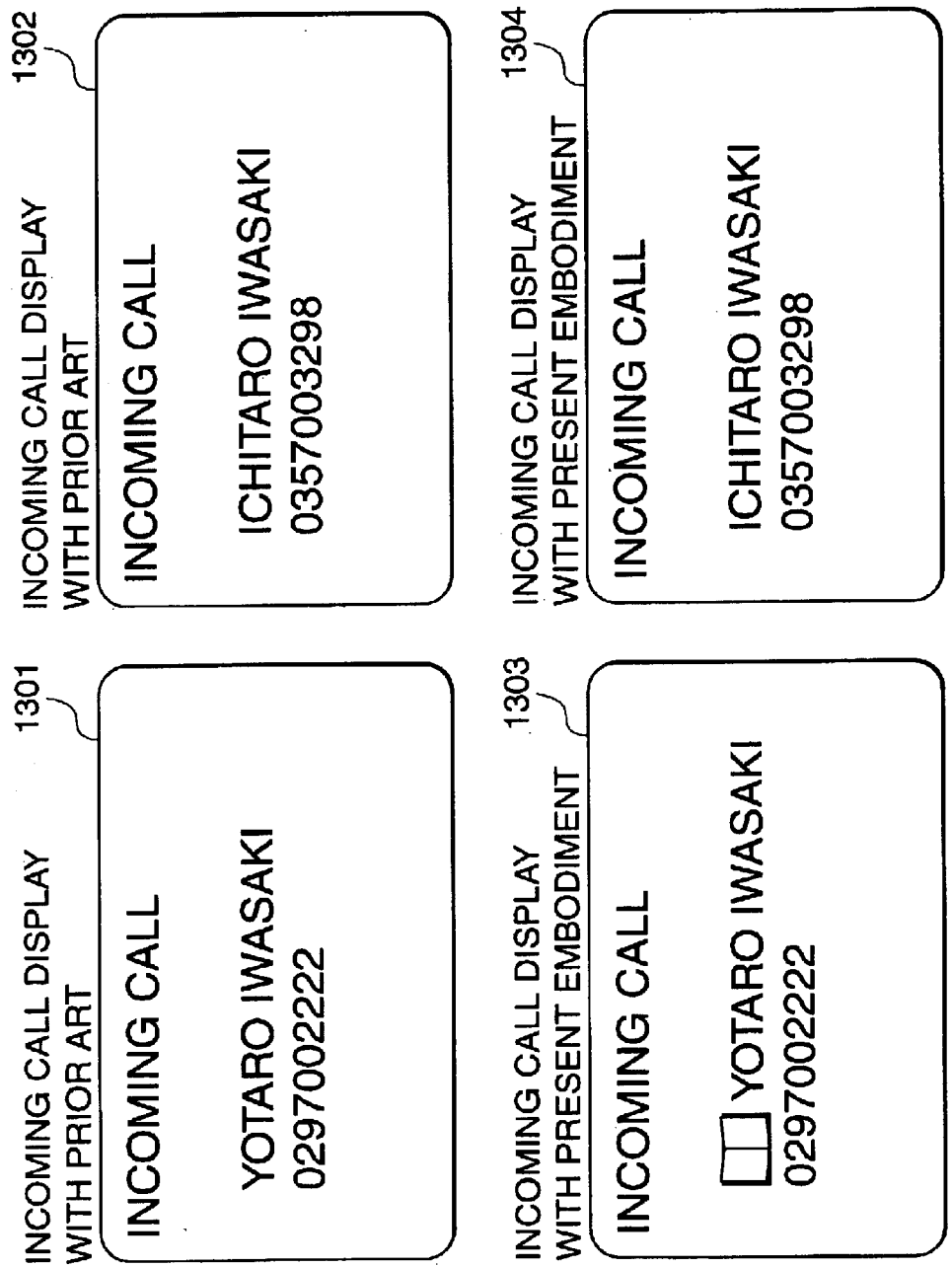
FIG. 7 shows examples of information displayed at the time of arrival of incoming calls by the communication apparatus and examples of information displayed at the time of arrival of incoming calls with the prior art.

FIG. 7 shows examples of information displayed at the time of arrival of incoming calls by the communication apparatus 100 and examples of information displayed at the time of arrival of incoming calls with the prior art. With the prior art, when there is received an incoming call from an opposite party "Yotaro Iwasaki: 0297002222" that is registered in the telephone directory of a conventional communication terminal, the incoming call is displayed as indicated by reference numeral 1301 in FIG. 7. On the other hand, when there is received an incoming call from an opposite party "Ichitaro Iwasaki: 0357003298" that is not registered in the telephone directory, the incoming call is displayed as indicated by reference numeral 1302 in FIG. 7. That is, the incoming call displaying is performed in the same manner in both of these cases, so that if a user does not remember the registered contents of the telephone directory, it is impossible for the user to determine whether the opposite party making a call is an opposite party registered in the telephone directory or not and may feel anxiety about answering the call. The example specified by reference numeral 1302 in FIG. 7 is a rare case because this example is a case where it is assumed that an opposite party that the user does not know has a name that is very similar to a name registered in the telephone directory. However, in the case where a communication terminal is shared by a plurality of users, it is impossible for each user to grasp opposite parties registered by other users, so that it is difficult for the users to discriminate whether an incoming call is placed by a person known by them or is placed by a person, who is not known by them, using the conventional displaying.

In contrast to this, in the present embodiment, in order to eliminate the aforementioned inconvenience that occurs with the prior art, when an incoming call from the opposite party "Yotaro Iwasaki: 0297002222" registered in the telephone directory data 201 of the communication apparatus 100 arrives, a telephone directory mark showing that the telephone number and name of the caller have already been registered is displayed along with the opposite party's name and telephone number, as indicated by reference numeral 1303 in FIG. 7. On the other hand, when an incoming call from the opposite party "Ichitaro Iwasaki: 0357003298" that is not registered in the telephone directory arrives, only the opposite party's name and telephone number are displayed as indicated by reference numeral 1304 in FIG. 7. As a result, it becomes possible for a user to judge whether an opposite party making a call is an opposite party registered in the telephone directory data 201 or not at a glance.

In the present embodiment, in the case where an incoming call from an opposite party registered in the telephone directory data 201 arrives, a notification that the opposite party has already been registered is displayed using the telephone directory mark. In contrast to this, in the case where an incoming call from an opposite party that is not registered in the telephone directory data 201 arrives, a notification that the opposite party is not yet registered may be displayed (for instance, a mark or character showing that the opposite party is not yet registered may be displayed).

Figure 8:
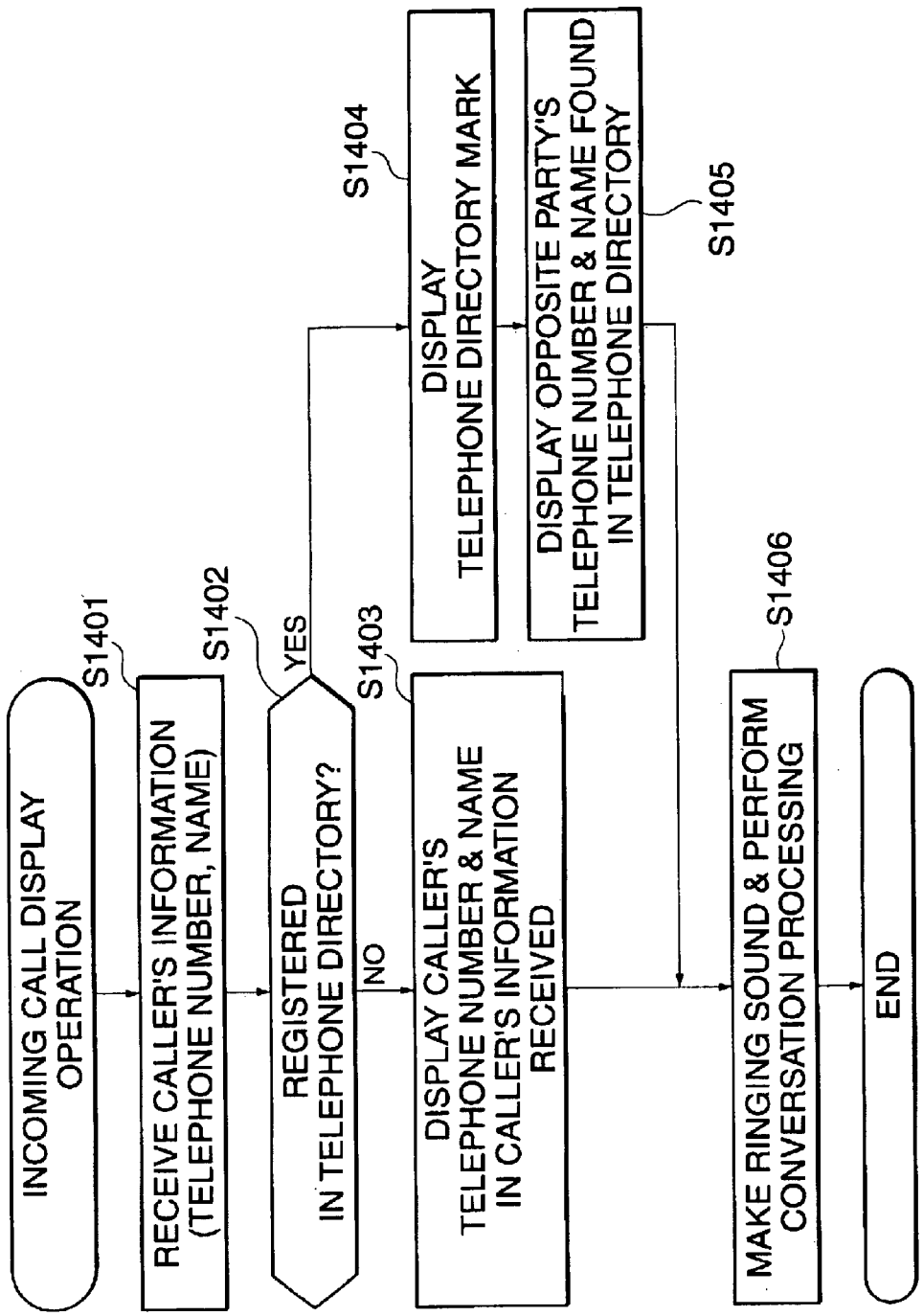
FIG. 8 is a flowchart showing an incoming call display operation of the communication apparatus.

FIG. 8 is a flowchart showing an incoming call display operation of the communication apparatus 100. How the communication apparatus 100 operates at the time of arrival of an incoming call in the present embodiment will be described with reference to this flowchart. The processing shown in this flowchart is carried out by the controller 104 of the communication apparatus 100 based on a control program stored in the ROM 103.

In step S1401, the controller 104 of the communication apparatus 100 receives caller's information (caller's telephone number and caller's name) from a switching system through the communication line 108 and the NCU 101 and the process proceeds to step S1402. In step S1402, the controller 104 searches the telephone directory data 201 in the RAM 102 for the caller's telephone number contained in the caller's information received in step S1401 described above. If the caller's telephone number contained in the received caller's information is registered in the telephone directory data 201, the process proceeds to step S1404. On the other hand, if the caller's telephone number contained in the received caller's information is not registered in the telephone directory data 201, the process proceeds to step S1403.

In the case where the caller's telephone number in the received caller's information is not registered in the telephone directory data 201, the process proceeds to step S1403, in which the controller 104 displays the caller's telephone number and caller's name in the caller's information received in step S1401 on the display section 106, as indicated by reference numeral 1304 in FIG. 7. On the other hand, in the case where the caller's telephone number in the received caller's information is registered in the telephone directory data 201, the process proceeds to step S1404, in which the controller 104 displays the telephone directory mark on the display section 106 and the process proceeds to step S1405. In step S1405, the controller 104 displays the opposite party's telephone number and name found in the telephone directory data 201 on the display section 106 along with the telephone directory mark that has already been displayed, as indicated by reference numeral 1303 in FIG. 7. In step S1406, the controller 104 makes a ringing sound in synchronism with a ringing signal coming from the communication line 108 through the NCU 101 and when the user answers the call, carries out conversation processing.

As described above, according to the second embodiment, the controller 104 of the communication apparatus provides control such that in the case where the caller's telephone number in caller's information received through the NCU 101 at the time of arrival of an incoming call is not registered in the telephone directory data 201, 4 the caller's telephone number and caller's name contained in the received caller's information are displayed on the display section 106, and on the other hand, in the case where the caller's telephone number contained in the received caller's information is registered in the telephone directory data 201, the telephone directory mark is displayed on the display section 106 and the opposite party's telephone number and name found in the telephone directory data 201 are displayed on the display section 106. As a result, an effect can be obtained that by checking whether the telephone directory mark is contained in information displayed by the communication apparatus at the time of arrival of an incoming call, it becomes possible for a user to grasp whether the incoming call is from an acquaintance registered in the telephone directory data 201 or from a person who is not registered in the telephone directory data 201.

Although in the second embodiment, as an example, the telephone directory mark shown in FIG. 7 is displayed at the time of arrival of an incoming call from an opposite party registered in the telephone directory data of the communication apparatus, the present invention is not limited to the telephone directory mark shown in FIG. 7 and there may be used another type of mark showing that the opposite party has already been registered so long as it is possible for a user to clearly know that the opposite party is a person, who has already been registered, with reference to the mark. Also, instead of displaying a mark showing that an opposite party has already been registered, there may be displayed a character showing that the opposite party has already been registered. Also, a mark or character showing that the caller has already been registered may be displayed in a flashing manner.

Also, although in the second embodiment, as an example, an opposite party's telephone number as opposite party's ID and an opposite party's name are registered in association with each other in the telephone directory data of the communication apparatus, as shown in FIG. 6, the present invention is not limited to the registration example shown in FIG. 6. For instance, in addition to the opposite party's telephone number (opposite party's ID) and the opposite party's name, a simplified address (A-town, B-city, C-ward, and the like) of the opposite party may be registered as the opposite party's ID in association with each other.

Also, although in the second embodiment, as an example, the communication apparatus of the present invention is applied to a facsimile apparatus, the present invention is not limited to the facsimile apparatus and is also applicable to a desk telephone set, a mobile telephone set, or an automobile telephone set.

Next, a description will be given of a third embodiment of the present invention. The third embodiment is outlined as follows: When opposite parties's names in the incoming call history are displayed at the communication apparatus, this displaying is performed in a manner discriminating between opposite parties's names received from the name display service and opposite parties's names written in the telephone directory of the communication apparatus. That is, a telephone number matching a caller's telephone number contained in received caller's information is searched from the telephone directory. If the matching telephone number is found, the opposite party's name written in the telephone directory and a notification showing this situation are stored. On the other hand, if the matching telephone number is not found, a caller's name contained in the caller's information and a notification showing this situation are stored. At the time of displaying of the incoming call history, the displayed contents are changed in accordance with the stored contents. Also, the storing of the incoming call history is performed using received opposite party's name and telephone number and, when the incoming call history is displayed, the telephone directory is searched for a name corresponding to the telephone number stored in the incoming call history. If the corresponding name is found, the name written in the telephone directory is displayed as the incoming call history.

It should be noted that the construction of the communication apparatus according to the third embodiment is the same as that of the communication apparatus according to the first embodiment (see FIG. 1) and therefore detailed description of the construction of the communication apparatus according to the present embodiment is omitted.

FIG. 9A shows an example of the structure of the telephone directory data 201 stored in the RAM 102 of the communication apparatus 100 and FIG. 9B shows an example of the structure of the incoming call history data 202 stored in the RAM 102 of the communication apparatus 100. In the telephone directory data 201 shown in FIG. 9A, opposite parties's telephone numbers (opposite parties's IDs) and opposite parties's names are registered in association with each other. In the incoming call history data 202 in FIG. 9B, the incoming call history of caller's information received by the communication apparatus 100, that is, each opposite party's telephone number (caller's ID), each opposite party's name (caller's name), and a telephone directory registration flag are stored in association with each other. Here, the telephone directory registration flag is for discriminating whether the opposite party's name is the received opposite party's name ("0"=OFF) or the opposite party's name written in the telephone directory ("1"=ON)

FIG. 10A shows an example of incoming call history display 2304 in the present embodiment, and FIG. 10B shows an example of incoming call history display 2303 in the case of the prior art. In the incoming call history display 2303 in the case of the prior art shown in FIG. 10B, telephone numbers and names (opposite parties's names) are merely displayed in association with each other. In contrast to this, in the incoming call history display 2304 in the present embodiment shown in FIG. 10A, telephone numbers and names (opposite parties's names) are displayed in association with each other and in addition, in the case where an opposite party's name stored in the incoming call history data 202 is an opposite party's name written in the telephone directory, a telephone directory mark ($T_{EL}$) is additionally displayed before the name (opposite party's name), for instance.

Next, the operation of the communication apparatus 100 according to the third embodiment will be described in detail with reference to FIG. 1 and FIGS. 9A to 12B.

FIG. 11 is a flowchart showing an incoming call history storing operation of the communication apparatus 100 at the time of arrival of an incoming call. How the communication apparatus 100 operates will be described with reference to the flowchart shown in FIG. 11. The processing shown in this flowchart is carried out by the controller 104 based on a control program stored in the ROM 103.

In step S2401, the controller 104 receives caller's information from a switching system through the communication line 108 and the NCU 101 and the process proceeds to step S2402. In step S2402, the controller 104 searches the telephone directory data 201 in the RAM 102 for an opposite party's telephone number matching the caller's telephone number contained in the caller's information received in step S2401 described above. If the opposite party's telephone number matching the caller's telephone number is found in the telephone directory data 201, the process proceeds to step S2403. On the other hand, if the opposite party's telephone number matching the caller's telephone number is not found in the telephone directory data 201, the process proceeds to step S2404.

In the case where the opposite party's telephone number matching the caller's telephone number is not found in the telephone directory data 201, the process proceeds to step S2404, in which the controller 104 stores the caller's telephone number and caller's name contained in the caller's information received in step S2401, as well as a notification that the caller's name is a received name, as the incoming call history. Specifically, as shown in the structure in FIG. 9B, the data mentioned above (the caller's telephone number, the caller's name, and the notification that the caller's name is a received name) is stored as the incoming call history data 202 in the RAM 102. The telephone directory registration flag shown in FIG. 9B serves as the notification that the caller's name is a received name, that is, for discriminating whether the opposite party's name is the received opposite party's name or the opposite party's name written in the telephone directory, as described above. In step S2404, the controller 104 sets the telephone directory registration flag at "0" (OFF) because the opposite party's name is the received opposite party's name (because the opposite party's telephone number matching the caller's telephone number is not found in the telephone directory data 201).

In the case where the opposite party's telephone number matching the caller's telephone number is found in the telephone directory data 201, the process proceeds to step S2403, in which the controller 104 stores the opposite party's telephone number and opposite party's name found in the telephone directory data 201, as well as a notification that the opposite party's name is a name written in the telephone directory, as the incoming call history. Specifically, as shown in the structure in FIG. 9B, the data described above (the opposite party's telephone number, the opposite party's name, and the notification that the opposite party's name is written in the telephone directory) is stored as the incoming call history data 202 in the RAM 102. In step S2403, the controller 104 sets the telephone directory registration flag at "1" (ON) because the opposite party's name is written in the telephone directory (because the opposite party's telephone number matching the caller's telephone number is found in the telephone directory data 201).

When the processing in step S2403 or S2404 described above is finished, the process proceeds to step S2405. In step S2405, the controller 104 makes a ringing sound in synchronism with a ringing signal coming from the communication line 108 through the NCU 101 and, when the user of the communication apparatus 100 answers the call, carries out conversation processing.

Figure 12A:
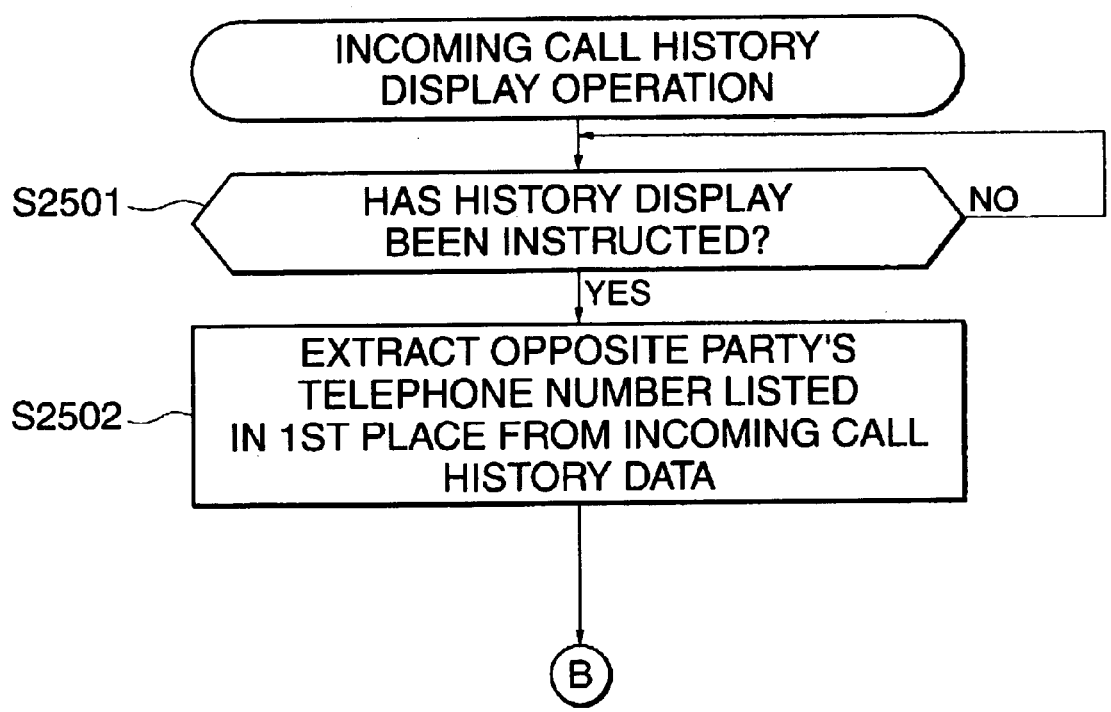
FIG. 12 is a flowchart showing an incoming call history display operation of the communication apparatus.
Figure 12B:
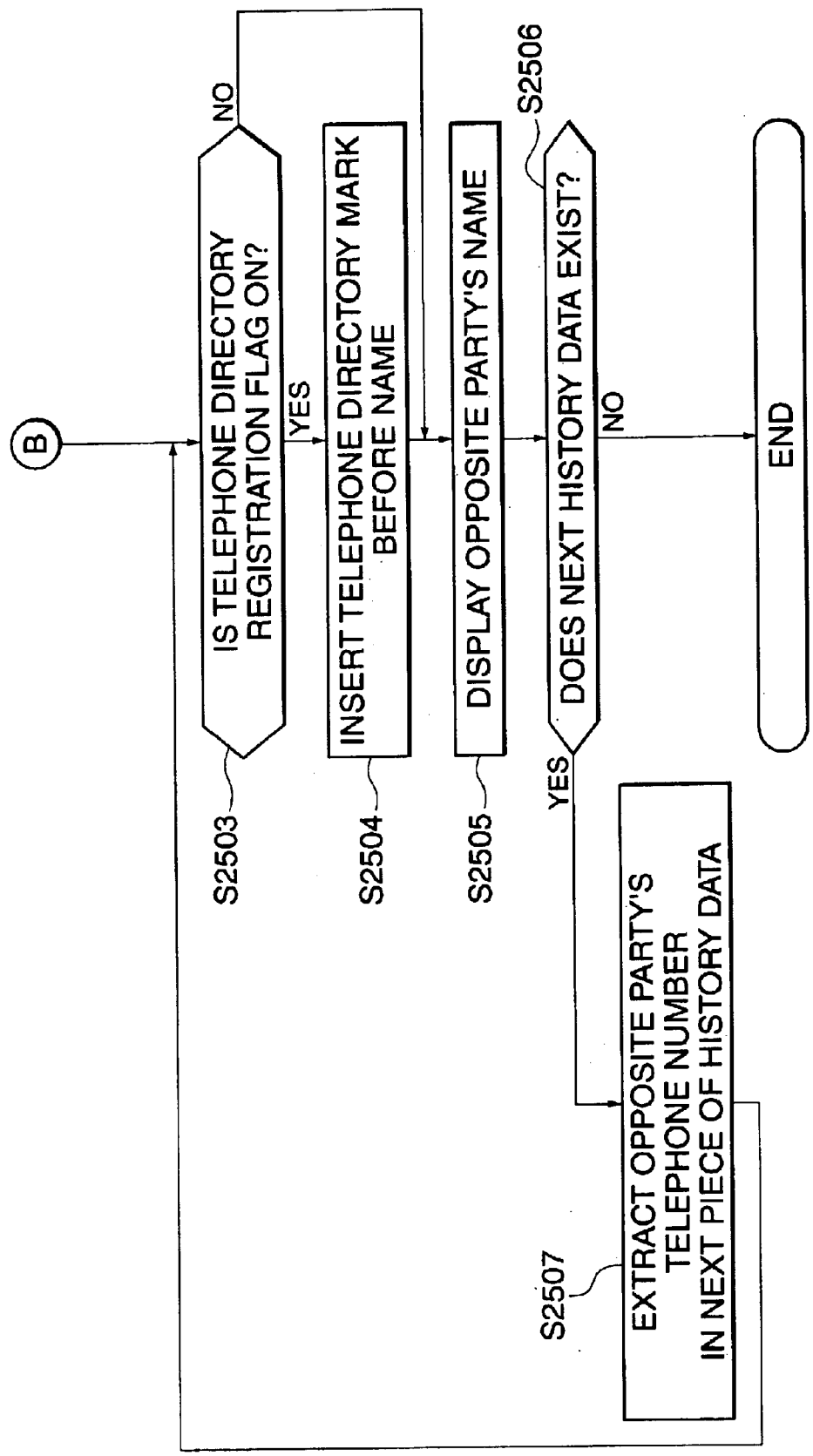

FIG. 12 is a flowchart showing an incoming call history displaying operation of the communication apparatus 100. How the communication apparatus 100 operates will be described with reference to the flowchart shown in FIG. 12. The processing shown in this flowchart is carried out by the controller 104 based on a control program stored in the ROM 103.

In step S2501, the controller 104 determines whether displaying of the incoming call history has been instructed, based on the presence or absence of a signal from the operation section 105. If it is determined that the incoming call history displaying has been instructed, the process proceeds to step S2502. In step S2502, the controller 104 reads the incoming call history data 202 from the RAM 102 and extracts the opposite party's telephone number listed in the first place from the incoming call history data 202. Next, in step S2503, the controller 104 checks whether an opposite party's name corresponding to the first opposite party's telephone number extracted from the incoming call history data 202 is the received opposite party's name, using the telephone directory registration flag.

If it is determined that opposite party's name stored in the incoming call history data 202 is a name written in the telephone directory based on the checking using the telephone directory registration flag described above, the process proceeds to step S2504. In step S2504, the controller 104 inserts the telephone directory mark at a predetermined position of the incoming call history data 202 (before the front end of the opposite party's name, for instance). If it is determined that opposite party's name stored in the incoming call history data 202 is the received opposite party's name based on the checking using the telephone directory registration flag described above, the process proceeds to step S2505. In step S2505, the controller 104 displays an opposite party's name selected by the operation section 105 on the display section 106. Note that in some cases, the opposite party's telephone number may also be displayed on the display section 106 in addition to the opposite party's name.

When the processing in step S2505 described above is finished, the process proceeds to step S2506. In step S2506, the controller 104 determines whether the next piece of the incoming call history information exists in the incoming call history data 202. If it is determined that the next piece of the incoming call history information does not exist in the incoming call history data 202, the controller 104 ends the present process. On the other hand, if it is determined that the next piece of the incoming call history information exists in the incoming call history data 202, the process proceeds to step S2507. In step S2507, the controller 104 extracts the opposite party's telephone number contained in the next piece of the incoming call history information from the incoming call history data 202. Then, the processing in steps S2503 to S2507 described above is repeated and the obtained information is additionally displayed in order on the display section 106.

An example of information displayed on the display section 106 as a result of the processing described above is the incoming call history display 2304 in FIG. 10A. In the example shown in FIG. 10A, not only opposite parties's names and the opposite parties's telephone numbers but also the telephone directory marks are displayed on the display section 106. As can be seen from FIG. 10A, in the case of an opposite party's name written in the telephone directory, the telephone directory mark is displayed before the opposite party's name. Therefore, it is possible for a user to discriminate whether the opposite party's name is an opposite party's name written in the telephone directory or an received opposite party's name at a glance. As a result, user's confusion can be avoided.

As described above, according to the third embodiment, when the stored contents of the incoming call history data 202 are displayed, it is determined whether each name stored in the incoming call history data 202 is an opposite party's name registered in the telephone directory data 201 or a received caller's name and displaying is switched according to a result of this determination. That is, displaying is performed so that it is possible to judge whether each opposite party's name displayed as the incoming call history information is an opposite party's name written in the telephone directory or an opposite party's name received from the name display service. Therefore, an effect can be provided that it is possible for a user to discriminate a caller at a glance and to confirm the importance or the like of a received telephone call with ease. In addition, it is possible to avoid user's confusion that has conventionally been caused.

Next, a fourth embodiment of the present invention will be described. In this fourth embodiment, received opposite parties's names are always stored as incoming call history information stored as the incoming call history data 202 in the RAM 102 of the communication apparatus 100. Then, the incoming call history information of the incoming call history data 202 is checked against the opposite parties's telephone numbers stored in the telephone directory data at the time of displaying of the incoming call history information. In the case where a matching opposite party's telephone number exists in the telephone directory data, a corresponding opposite party's name is displayed in a discriminating manner like in the first embodiment. As a result, the same effect can be obtained as in the third embodiment.

It should be noted that the construction of the communication apparatus 100 and the constructions of the telephone directory data and the incoming call history data in the fourth embodiment are the same as those in the third embodiment (see FIG. 1 and FIGS. 9A and 9B), and therefore description thereof is omitted in the present embodiment.

Next, the operation of the communication apparatus 100 according to the fourth embodiment will be described in detail with reference to FIGS. 1, 9A, 9B, 13, 14A and 14B.

Figure 13:
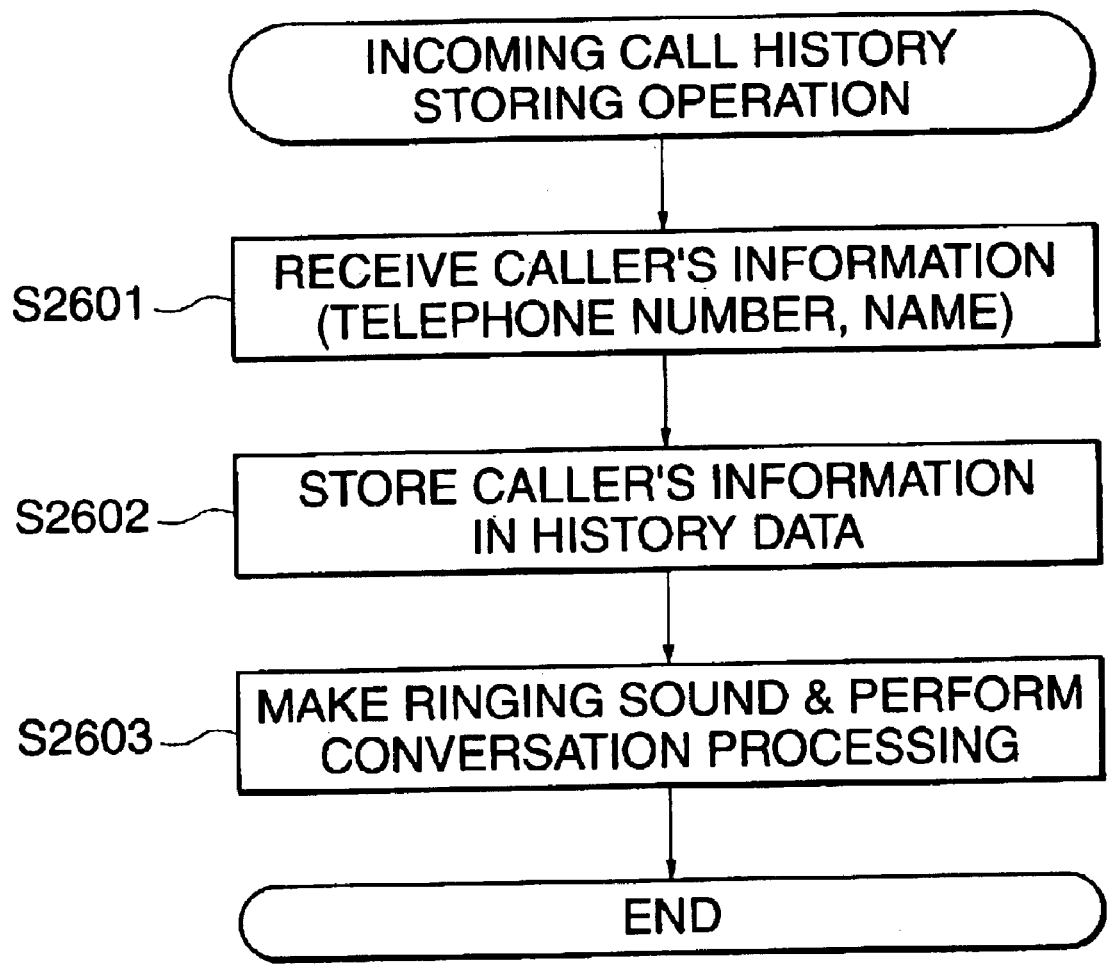
FIG. 13 is a flowchart showing an incoming call history storing operation according to a fourth embodiment of the present invention.
Figure 14A:
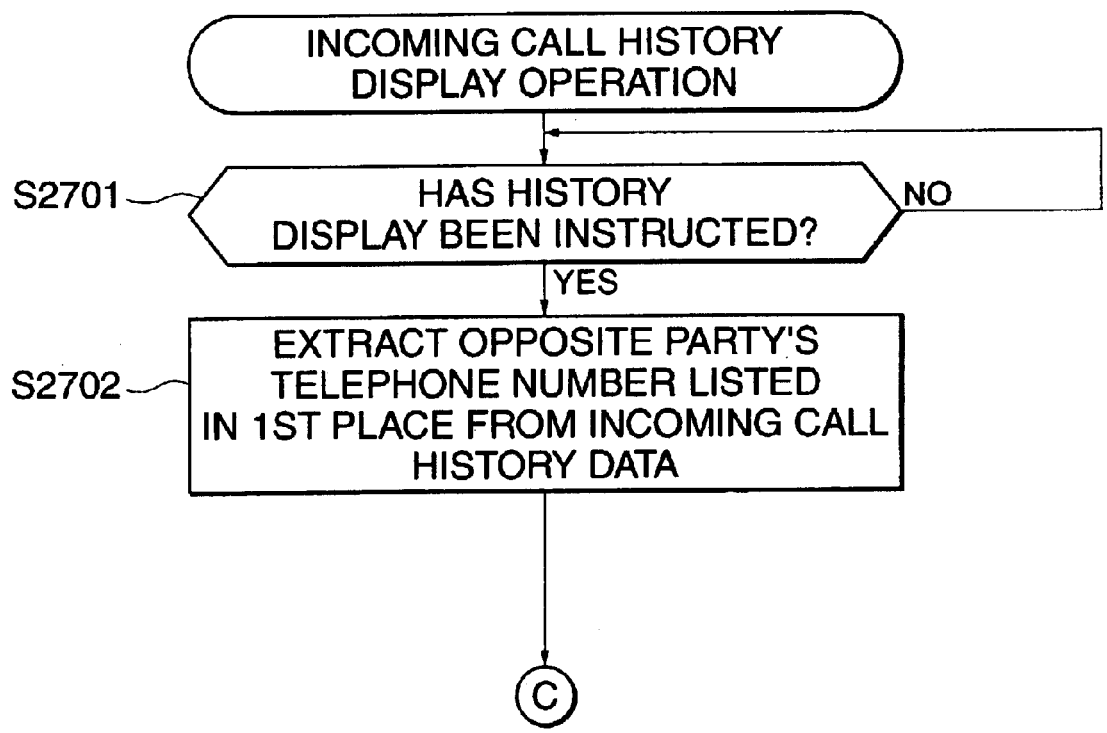
FIG. 14 is a flowchart showing an incoming call history display operation of the communication apparatus.
Figure 14B:
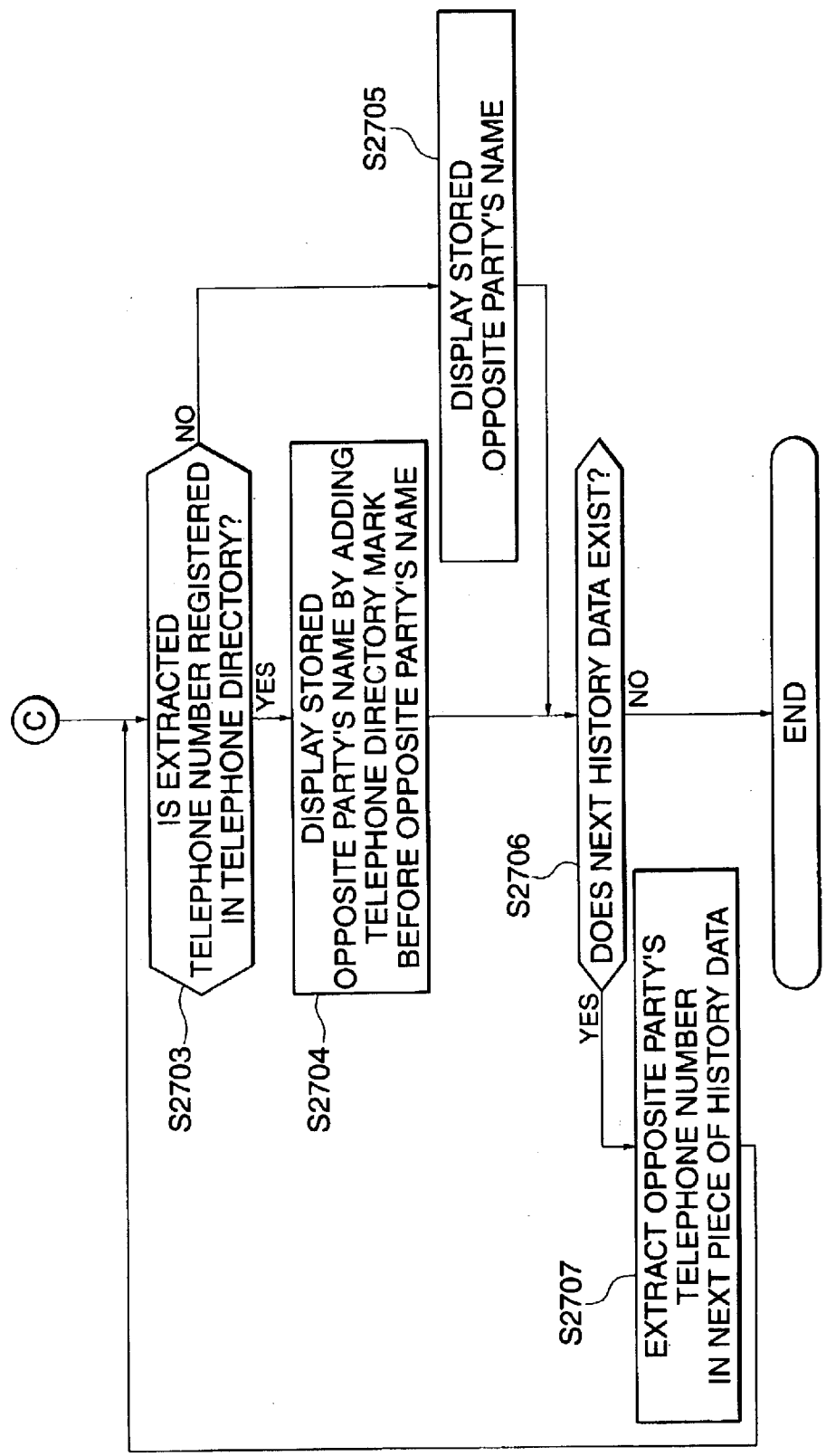

FIG. 13 is a flowchart showing an incoming call history storing operation of the communication apparatus 100 at the time of arrival of an incoming call. How the communication apparatus 100 operates will be described with reference to the flowchart shown in FIG. 13. The processing shown in this flowchart is carried out by the controller 104 based on a control program stored in the ROM 103.

In step S2601, the controller 104 receives caller's information from a switching system via the communication line 108 and the NCU 101 and the process proceeds to step S2602. In step S2602, the controller 104 stores the caller's telephone number and caller's name contained in the caller's information received in step S2601 described above as the incoming call history data 202 in the RAM 102. In this case, searching of the telephone directory data 201 is not performed, so that the telephone directory registration flag shown in FIG. 9B is not used. Next, in step S2603, the controller 104 makes a ringing sound in synchronism with a ringing signal coming from the communication line 108 through the NCU 101 and, when the user of the communication apparatus 100 answers the call, carries out conversation processing.

FIG. 14 is a flowchart showing an incoming call history displaying operation of the communication apparatus 100. How the communication apparatus 100 operates will be described with reference to the flowchart shown in FIG. 14. The processing shown in this flowchart is carried out by the controller 104 based on a control program stored in the ROM 103.

In step S2701, the controller 104 determines whether displaying of the incoming call history has been instructed based on the presence or absence of a signal from the operation section 105. If it is determined that the incoming call history displaying has been instructed, the process proceeds to step S2702. In step S2702, the controller 104 reads the incoming call history data 202 from the RAM 102 and extracts an opposite party's telephone number listed in the first place from the incoming call history data 202. Next, in step S2703, the controller 104 checks the first opposite party's telephone number extracted from the incoming call history data 202 against the opposite parties's telephone numbers stored in the telephone directory data 201.

If it is determined that the opposite party's telephone number extracted from the incoming call history data 202 is stored in the telephone directory data 201, the process proceeds to step S2704, in which the controller 104 inserts the telephone directory mark before an opposite party's name corresponding to the extracted opposite party's telephone number mentioned above, and displays the opposite party's name stored in the telephone directory data 201 on the display section 106. If it is determined that the opposite party's telephone number extracted from the incoming call history data 202 is not stored in the telephone directory data 201, the process proceeds to step S2705, in which the controller 104 displays the opposite party's name stored in the incoming call history data 202 (received opposite party's name) on the display section 106 as it is.

When the processing in step S2704 or S2705 described above is finished, the process proceeds to step S2706. In step S2706, the controller 104 determines whether the next piece of incoming call history information exists in the incoming call history data 202. If it is determined that the next piece of incoming call history information does not exist in the incoming call history data 202, the present process is terminated. On the other hand, if it is determined that the next incoming call history information exists in the incoming call history data 202, the process proceeds to step S2707. In step S2707, the controller 104 extracts an opposite party's telephone number in the next piece of incoming call history information from the incoming call history data 202 and repeats the processing in steps S2703 to S2707 described above, thereby additionally displaying information in order on the display section 106.

As has been described above, according to the fourth embodiment, when the storage contents of the incoming call history data 202 are displayed, each opposite party's ID matching a caller's ID in the caller's information stored in the incoming call history data 202 is searched from the telephone directory data 201. In the case where the matching opposite party's ID is not found, a caller's name contained in the caller's information is displayed. On the other hand, in the case where the matching opposite party's ID is found, the opposite party's name registered in association with the opposite party's ID is displayed in a manner being distinguished from the caller's name. As a result, as is the case with the first embodiment, an effect can be provided that it is possible for a user to discriminate callers at a glance and to avoid user's confusion that has conventionally been caused. In addition, an effect can be provided that because searching of the telephone directory is performed at the time of displaying of the incoming call history information, the communication apparatus is not required to store redundant information as the incoming call history information and therefore it becomes possible to reduce the storage capacity of the communication apparatus.

Although in the third and fourth embodiments described above, as an example, if a name displayed as the incoming call history is a name written in the telephone directory, the telephone directory mark is added before the name, the present invention is not limited to this and the position, at which the telephone directory mark is added, may be arbitrarily changed (at the end of the name, for instance). Also, it is possible to employ various kinds of display methods, such as a method, with which another sign is added instead of the telephone directory mark, and a method with which the name is displayed in a flashing manner instead of adding the telephone directory mark or another sign.

Also, although in the third and fourth embodiments, as an example, the communication apparatus is a facsimile apparatus, the present invention is not limited to this and is also applicable to another type of communication terminal such as a desk telephone set, a mobile telephone set, or an automobile telephone set.

The present invention may either be applied to a system composed of a plurality of apparatuses or to a single apparatus.

It is to be understood that the object of the present invention may also be accomplished by supplying a system or an apparatus with a storage medium (or a recording medium) storing a program code of software which realizes the functions of any of the above described embodiments, and causing a computer (or CPU or MPU) of the system or apparatus to execute the supplied program code.

In this case, the program code itself read from the storage medium or the like realizes the novel functions of the present invention, and hence the program code and the storage medium or the like on which the program code is stored constitute the present invention.

Examples of the storage medium or the like for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, a ROM, or download via a network.

Further, it is to be understood that the functions of any of the above described embodiments may be accomplished not only by executing a program code read out by a computer, but also by causing an OS (Operating System) or the like which operates on the computer to perform a part or all of the actual operations based on instructions of the program code.

Further, it is to be understood that the functions of any of the above described embodiments may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A communication apparatus connected to a communication line that provides a service for informing of caller's information, comprising:

a display device;

a registration device that registers a plurality of opposite parties' Ips and a plurality of opposite parties' names in association with each other; and a display controller that performs incoming call displaying on said display device using a first display method when an opposite party matching an opposite party's ID contained in the caller's information received at a time of arrival of an incoming call is registered in said registration device, and performs the incoming call displaying on said display device using a second display method when the opposite party matching the opposite party's ID is not registered in said registration device, wherein the first display method comprises displaying registration information indicating that the opposite party's name registered in said registration device is being displayed, and information containing the opposite party's name, and wherein the registration information comprises a sign or a character showing that the opposite party matching the opposite party's ID has already been registered in said registration device.

2. A communication apparatus connected to a communication line that provides a service for informing of caller's information, comprising:

a display device;

a registratIon device that registers a plurality of opposite parties' IDs and a plurality of opposite parties' names in association with each other; and a display controller that performs incoming call displaying on said display device using a first display method when an opposite party matching an opposite party's ID contained in the caller's information received at a time of arrival of an incoming call is registered in said registration device, and performs the incoming call displaying on said display device using a second display method when the opposite party matching the opposite party's ID is not registered in said registration device, wherein the second display method comprises displaying unregistration information indicating that the opposite party's name contained in the caller's information is being displayed, and information containing the opposite party's name contained in the caller's information, and wherein the unregistration information comprises a sign or a character showing that the opposite party matching the opposite party's ID has not yet been registered in said registration device.

3. A communication apparatus connected to a communication line that provides a service for informing of caller's information, comprising:

a detection device that detects the caller's information;

a storage device that stores incoming call history related to the caller's information;

a registration device that registers a plurarity of opposite parties' IDs and a plurality of opposite parties' names in association with each other;

a storage controller that (a) searches said registration device for an opposite party's ID matching a caller's ID contained in the caller's information detected by said detection device at a time of arrival of an incoming call, (b) stores an opposite party's name registered in association with the matching opposite party's ID in said storage device when the matching opposite party's ID is found, and (c) stores a caller's name contained in the caller's information in said storage device when the matching opposite party's ID is not found; and a display controller that discriminates whether each name stored in said storage device is an opposite party's name registered in said registration device or a received callers name, in response to an instruction for displaying of storage contents of said storage device, and switches the displaying in accordance with a result of the discrimination, wherein:

when the matching opposite party's ID is found in said registration device, said storage controller stores an opposite party's telephone number as the opposite party's ID, the opposite party's name registered in association with the opposite party's ID, and a notification that the opposite party's name is a name registered in said registration device in said storage device, and when the matching opposite party's ID is not found in said registration device, said storage controller stores a caller's telephone number as the callers ID, the callers name, and a notification that the caller's name is a received name in said storage device.

4. A communication apparatus connected to a communication line that provides a service for informing of caller's information, comprising:

a detection device that detects the caller's informtion;

a storage device that stores incoming call history related to the caller's information;

a registration device in which a plurality of opposite parties' IDs and opposite parties' names are registered in association with each other;

a storage controller that stores the caller's information detected by said detection device at a time of arrrival of an incoming call in said storage device; and a display controller that (a) searches said registration device for an opposite party's ID matching a caller's ID contained in the caller's information stored in said stroage device when displaying of storage contents of said storage device is instructed, (b) displays a caller's name contained in the caller's information when the matching opposite party's ID is not found, and (c) displays an opposite party's name registered in association with the opposite party's ID in a manner such that the opposite party's name is dicriminated from the caller's name when the matching opposite party's ID is found, wherein when the matching opposite party's ID is found, said display controller displays the opposite party's name by adding a predetermined sign to the opposite party's name.

5. An incoming call display method executed by a communicatin apparatus connected to a communication line that provides a service for informing of caller's information and including a display device, and a registration device that registers a plurality of opposite parties' IDs and a plurality of opposite parties' names in association with each other, the method comprising:

wherein the first display method comprises displaying registration information indicating that the opposite party's name registered in the registration device is being displayed, and information containing the opposite party's name, and wherein the registration information comprises a sign or a character showing that the opposite party matching the opposite party's ID has already been registered in the registration device.

6. An incoming call display method executed by a communicatin apparatus connected to a communication line that provides a service for informing of caller's information and including a display device, and a registration device that registers a plurality of opposite parties' IDs and a plurality of opposite parties' names in association with each other, the method comprising:

a display control step of displaying incoming call on the display device using a first display method when an opposite party matching an opposite party's ID contained in the caller's information received at a time of arrival of an incoming call is registered in the registration device, ans using a second display method when the opposite party matching the opposite party's ID is not registered in the registration device, wherein the second display method comprises displaying unregistration information indicating that the opposite party's name contained in the caller's information is being displayed, and information containing the opposite party's name contained in the caller's information, and wherein the unregistration information comprises a sign or a character showing that the opposite party matching the opposite party's ID has not yet been registered in the registration device.

7. An incoming call history display method executed by a communication apparatus connected to a communication line that provides a service for informing of the caller's information, and including a detection device that detects the caller's information, a storage device that stores incoming call history related to the caller's information, and a registration device that registers a plurality of opposite partyies' IDs and a plurality of opposite parties' names in association with each other, the method comprising:

a detection step for detecting the caller's information;

a storage control step of (a) searching the registration device for an opposite party's ID matching a caller's ID contained in the caller's information detected in said step of detecting the caller's information at a time of arrival of an incoming call, (b) storing an opposite party's name registered in association with the matching opposite party's ID in the storage device when the matching opposite party's ID is found, and (c) storing a caller's name contained in the caller's information in the storage device when the matching opposite party's ID is not found; and a display control step of discriminating whether each name stored in the storage device is an opposite pary's name registered in the registration device or a received caller's name, in response to an instruction for displaying of storage contents of the storage device, and switching the displaying in accordance with a result of the discrimination, wherein:

when the matching opposite partyxs ID is found in the registration device, in said storage control step, an opposite party's telephone number as the opposite party's ID, the opposite party's name registered in association with the opposite party's ID, and a notification that the opposite party's name is a name registered in the registration device are stored in the storage device, and when the matching opposite party's ID is not found in the registration device, in said storage control step, a caller's telephone number as the caller's ID, the caller's name, and a notification that the caller's name is a received name are stored in the storage device.

8. An incoming call history display method executed by a communication apparatus connected to a communication line that provides a service for informing of the caller's information, and including a detection device that detects the caller's information, a storage device that stores incoming call history related to the caller's information, and a registration device that registers a plurality of opposite partyies' IDs and a plurality of opposite parties' names in association with each other, the method comprising:

a detection step for detecting the caller's information;

a storage control step of (a) searching the registration device for an opposite party's ID matching a caller's ID contained in the caller's information detected in said step of detecting the caller's information at a time of arrival of an incoming call, (b) storing an opposite party's name registered in association with the matching opposite party's ID in the storage device when the matching opposite party's ID is found, and (c) storing a caller's name contained in the caller's information in the storage device when the matching opposite party's ID is not found; and a display control step of discriminating whether each name stored in the storage device is an opposite pary's name registered in the registration device or a received caller's name, in response to an instruction for displaying of storage contents of the storage device, and switching the displaying in accordance with a result of the discrimination, wherein when determining that a name stored in the storage device is an opposite party's name registered in the registration device, in said display control step, the opposite party's name registered in the registration device is displayed by adding a predetermined sign to the opposite party's name.

9. An incoming call history display method executed by a communication apparatus connected to a communication line that provides a service for informing of the caller's information, and including a detection device that detects the caller's information, a storage device that stores incoming call history related to the caller's information, and a registration device that registers a plurality of opposite partyies' IDs and a plurality of opposite parties' names in association with each other, the method comprising:

a detection step for detecting the caller's information;

a storage control step of storing the caller's information detected in said step of detecting the caller's information at a time of arrival of an incoming call in the storage device; and a display control step of (a) searching the registration device for an opposite party's ID matching a caller's ID contained in the caller's information stored in the storage device when displaying of storage contents of the storage device is instructed, (b) displaying a caller's name contained in the caller's information when the matching opposite party's Id is not found, and (c) displaying an opposite party's name registered in association with the opposite party's ID in a manner such that the opposite party's name is discriminated from the caller's name when the matching opposite party's Id is found, wherein when the matching opposite party's ID is found, in said controller step, the opposite party's name is displayed by adding a predetermined sign to the opposite party's name.

10. A program for executing an incoming call display method by communication apparatus connected to a communication line that provides a service for informing of caller's information and including a display device, and a registration device that registers a plurality of opposite parties' IDs and a plurality of opposite parties' names in association with each other, the program comprising:

a display control module for performing incoming call displaying on the display device using a first display method when an opposite party matching an opposite party's ID contained in the caller's information received at a time of arrival of an incoming call is registered in the registration device, and performing the incoming call displaying on the display device using a second display method when the opposite party matching the opposite party's ID is not registered in the registration device, wherein the first display method comprises displaying registration information indicating that the opposite party's name registered in the registration device is being displayed, and information containing the opposite party's name, and wherein the registration information comprises a sign or a character showing that the opposite party matching the opposite party's ID has already been registered in the registration device.

11. A program for executing an incoming call display method by communication apparatus connected to a communication line that provides a service for informing of caller's information and including a display device, and a registration device that registers a plurality of opposite parties' IDs and a plurality of opposite parties' names in association with each other, the program comprising:

a display control module for performing incoming call displaying on the display device using a first display method when an opposite party matching an opposite party's ID contained in the caller's information received at a time of arrival of an incoming call is registered in the registration device, and performing the incoming call displaying on the display device using a second display method when the opposite party matching the opposite party's ID is not registered in the registration device, wherein the second display method comprises displaying unregistration information indicating that the opposite party's name contained in the caller's information is being displayed, and information containing the opposite party's name contained in the caller's information, and wherein the unregistration information comprises a sign or a character showing that the opposite party matching the opposite party's ID has not yet been registered in the registration device.

12. A program for executing an incoming call history display method by a communication apparatus connected to a communication line that provides a service for informing of caller's information, and including a detection device that detects the caller's information, a storage device that stores incoming call history related to the caller's information, a registration device that registers a plurality of opposite parties' IDs and a plurality of opposite parties' names in association with each other, the program comprising:

a detection module for detecting the caller's information;

as storage module for (a) searching the registration device for an opposite party's ID matching a caller's ID contained in the caller's information detected at a time of arrival of an incoming call, (b) storing an opposite party's name registered in association with the matching opposite party's ID in the storage device when the matching opposite party's ID is found, and (c) storing a caller's name contained in the caller's information in the storage device when the matching opposite party's ID is not found; and a switching module for discriminating whether each name stored in the storage device is an opposite party's name registered in the registration device or a received caller's name, in response to an instruction for displaying of storage contents of the storage device, and switching the displaying in accordance with a result of the discrimination, wherein:

when the matching opposite party's ID is found in the registration device, said storage module stores an opposite party's telephone number as the opposite party's ID, the opposite party's name registered in association with the opposite party's ID and a notification that the opposite party's name is a registered in the registration device in the storage device, and when the matching opposite party's ID is not found in the registration device, said storage module stores a caller's telephone number as the caller's ID, the caller's name, and a notification that the caller's name is a received name in the storage device.

13. A program for executing an incoming call history display method by a communication apparatus connected to a communication line that provides a service for informing of caller's information, and including a detection device that detects the caller's information, a storage device that stores incoming call history related to the caller's information, a registration device that registers a plurality of opposite parties' IDs and a plurality of opposite parties' names in association with each other, the program comprising:

a detection module for detecting the caller's information;

as storage module for (a) searching the registration device for an opposite party's ID matching a caller's ID contained in the caller's information detected at a time of arrival of an incoming call, (b) storing an opposite party's name registered in association with the matching opposite party's ID in the storage device when the matching opposite party's ID is found, and (c) storing a caller's name contained in the caller's information in the storage device when the matching opposite party's ID is not found; and a switching module for discriminating whether each name stored in the storage device is an opposite party's name registered in the registration device or a received caller's name, in response to an instruction for displaying of storage contents of the storage device, and switching the displaying in accordance with a result of the discrimination, wherein when determining that a name stored in the storage device is an opposite party's name registered in the registration device, said switching module switches the displaying to display the opposite party's name registered in the registration device by adding a predetermined sign to the opposite party's name.

14. A program for executing an incoming call history display method by a communication apparatus connected to a communication line that provides a service for informing of caller's information, and including a detection device that detects the caller's information, a storage device that stores incoming call history related to the caller's information, a registration device that registers a plurality of opposite parties' IDs and a plurality of opposite parties' names in association with each other, the program comprising:

a detection module for detecting the caller's information;

as storage control module for storing the caller's information detected at a time of arrival of an incoming call in the storage device; and a display control module for (a) searching the registration device for an opposite party's ID matching a caller's ID contained in the caller's information stored in the storage device when displaying of storage contents of the storage device is instructed, (b) displaying a caller's name contained in the caller's information when the matching opposite party's ID is not found, and (c) displaying an opposite party's name registered in association with the opposite party's ID in a manner such that the opposite party's name is discriminated from the caller's name when the matching opposite party's ID is found, wherein the matching opposite party's ID is found, said display controller module displays the opposite party's name by adding a predetermined sign to the opposite party's name.

15. A communication apparatus connected to a communication line that provides a service for informing of caller's information, comprising:

a detection device that detects the caller's information;

a storage device that stores incoming call history related to the caller's information;

a registration device that registers a plurality of opposite parties' IDs and a plurality of opposite parties' names in association with each other;

a storage controller that (a) searches said registration device for an opposite party's ID matching a caller's ID contained in the caller's information detected by said detection device at a time of arrival of an incoming call, (b) stores an opposite party's name registered in association with the matching opposite party's ID in said storage device when the matching opposite party's ID is found, and (c) stores a caller's name contained in the caller's information in said storage device when the matching opposite party's ID is not found; and a display controller that discriminates whether each name stored in said storage device is an opposite party's name registered in said registration device or a received caller's name, in response to an instruction for displaying of storage contents of said storage device, and switches the displaying in accordance with a result of the discrimination, wherein when determining that a name stored in said storage device is an opposite party's name registered in said registration device, said display controller displays the opposite party's name registered in said registration device by adding a predetermined sign to the opposite party's name.

* * * * *